(12) United States Patent
Pham et al.

(10) Patent No.: US 8,993,183 B2
(45) Date of Patent: Mar. 31, 2015

(54) OPERATING A REDOX FLOW BATTERY WITH A NEGATIVE ELECTROLYTE IMBALANCE

(71) Applicant: EnerVault Corporation, Sunnyvale, CA (US)

(72) Inventors: Quoc Pham, Milpitas, CA (US); On Chang, San Jose, CA (US); Sumitha Durairaj, San Jose, CA (US)

(73) Assignee: EnerVault Corporation, Sunnyvale, CA (US)

( * ) Notice: Subject to any disclaimer, the term of this patent is extended or adjusted under 35 U.S.C. 154(b) by 0 days.

(21) Appl. No.: 14/095,362

(22) Filed: Dec. 3, 2013

(65) Prior Publication Data

US 2014/0186731 A1  Jul. 3, 2014

Related U.S. Application Data

(60) Provisional application No. 61/747,491, filed on Dec. 31, 2012.

(51) Int. Cl.
*H01M 8/18* (2006.01)
*H01M 8/20* (2006.01)
*H01M 8/04* (2006.01)

(52) U.S. Cl.
CPC .......... *H01M 8/188* (2013.01); *H01M 8/04186* (2013.01); *H01M 8/20* (2013.01); *H01M 8/04798* (2013.01); *Y02E 60/528* (2013.01)
USPC .......................................... 429/429

(58) Field of Classification Search
CPC .............................................. H01M 8/18–8/20
USPC ............... 429/409, 427, 450–451, 51, 63–64, 429/105–109
See application file for complete search history.

(56) References Cited

U.S. PATENT DOCUMENTS

| 4,307,159 A | 12/1981 | Hammond et al. |
| 4,362,791 A | 12/1982 | Kaneko et al. |

(Continued)

FOREIGN PATENT DOCUMENTS

| JP | 02054416 | 8/1988 |
| JP | S6482465 A | 3/1989 |

(Continued)

OTHER PUBLICATIONS

The International Search Report and the Written Opinion of the International Searching Authority for International Application No. PCT/US2013/077558, mailed on Apr. 15, 2014.

(Continued)

*Primary Examiner* — Barbara Gilliam
*Assistant Examiner* — Robert S Carrico
(74) *Attorney, Agent, or Firm* — The Marbury Law Group, PLLC

(57) ABSTRACT

Loss of flow battery electrode catalyst layers during self-discharge or charge reversal may be prevented by establishing and maintaining a negative electrolyte imbalance during at least parts of a flow battery's operation. Negative imbalance may be established and/or maintained actively, passively or both. Actively establishing a negative imbalance may involve detecting an imbalance that is less negative than a desired threshold, and processing one or both electrolytes until the imbalance reaches a desired negative level. Negative imbalance may be effectively established and maintained passively within a cell by constructing a cell with a negative electrode chamber that is larger than the cell's positive electrode chamber, thereby providing a larger quantity of negative electrolyte for reaction with positive electrolyte.

18 Claims, 12 Drawing Sheets

(56) References Cited

U.S. PATENT DOCUMENTS

| | | | |
|---|---|---|---|
| 4,377,623 A | 3/1983 | Parker et al. |
| 4,543,302 A | 9/1985 | Gahn et al. |
| 4,576,878 A | 3/1986 | Gahn |
| 4,732,827 A | 3/1988 | Kaneko et al. |
| 4,786,567 A | 11/1988 | Skyllas-Kazacos et al. |
| 4,814,241 A | 3/1989 | Nagashima et al. |
| 4,874,483 A | 10/1989 | Wakabayashi et al. |
| 4,956,244 A | 9/1990 | Shimizu et al. |
| 5,135,820 A | 8/1992 | Jones |
| 5,250,158 A | 10/1993 | Kaneko et al. |
| 5,258,241 A | 11/1993 | Heinzel et al. |
| 5,368,762 A | 11/1994 | Magome et al. |
| 5,587,132 A | 12/1996 | Nakajima et al. |
| 5,612,148 A | 3/1997 | Zito |
| 6,143,443 A | 11/2000 | Kazacos et al. |
| 6,455,187 B1 | 9/2002 | Tomazic |
| 6,468,688 B2 | 10/2002 | Kazacos et al. |
| 6,613,298 B2 | 9/2003 | Tanaka et al. |
| 6,652,819 B2 | 11/2003 | Shiroto et al. |
| 6,764,663 B2 | 7/2004 | Monaghan et al. |
| 6,764,789 B1 | 7/2004 | Sekiguchi et al. |
| 6,864,012 B2 | 3/2005 | Tomazic |
| 6,872,376 B2 | 3/2005 | Tanaka et al. |
| 6,986,966 B2 | 1/2006 | Clarke et al. |
| 7,078,123 B2 | 7/2006 | Kazacos et al. |
| 7,156,972 B2 | 1/2007 | Diel et al. |
| 7,258,947 B2 | 8/2007 | Kubata et al. |
| 7,297,437 B2 | 11/2007 | Clarke et al. |
| 8,338,008 B2 | 12/2012 | Zu et al. |
| 8,394,529 B2 | 3/2013 | Keshavarz et al. |
| 8,491,763 B2 | 7/2013 | Friesen |
| 8,541,121 B2 | 9/2013 | Keshavarz et al. |
| 8,551,299 B2 | 10/2013 | Keshavarz et al. |
| 8,668,997 B2 | 3/2014 | Zaffou et al. |
| 8,877,365 B2 | 11/2014 | Keshavarz et al. |
| 2003/0113615 A1 | 6/2003 | Tomazic |
| 2004/0121204 A1 | 6/2004 | Adelman et al. |
| 2004/0241552 A1 | 12/2004 | Skyllas-Kazacos |
| 2005/0287436 A1 | 12/2005 | Kawashige et al. |
| 2006/0063065 A1 | 3/2006 | Clarke et al. |
| 2008/0193828 A1 | 8/2008 | Sahu |
| 2008/0292964 A1 | 11/2008 | Kazacos et al. |
| 2009/0017379 A1 | 1/2009 | Inatomi et al. |
| 2010/0003545 A1* | 1/2010 | Horne et al. ............ 429/12 |
| 2010/0092843 A1 | 4/2010 | Conway |
| 2010/0143781 A1 | 6/2010 | Keshavarz et al. |
| 2010/0261070 A1 | 10/2010 | Keshavarz et al. |
| 2011/0074357 A1* | 3/2011 | Parakulam et al. ........ 320/134 |
| 2011/0081561 A1 | 4/2011 | Keshavarz et al. |
| 2011/0086247 A1 | 4/2011 | Keshavarz et al. |
| 2012/0077079 A1 | 3/2012 | Li et al. |
| 2012/0107660 A1 | 5/2012 | Li et al. |
| 2012/0135278 A1 | 5/2012 | Yoshie et al. |
| 2012/0202095 A1 | 8/2012 | Winter |
| 2012/0208061 A1 | 8/2012 | Sahu et al. |
| 2012/0295172 A1 | 11/2012 | Peled et al. |
| 2012/0299384 A1 | 11/2012 | Peled et al. |
| 2013/0084482 A1 | 4/2013 | Chang et al. |
| 2013/0095362 A1 | 4/2013 | Keshavarz et al. |
| 2013/0157162 A1 | 6/2013 | Dong et al. |
| 2014/0023943 A1 | 1/2014 | Keshavarz et al. |
| 2014/0028261 A1 | 1/2014 | Esswein et al. |
| 2014/0065460 A1 | 3/2014 | Evans et al. |

FOREIGN PATENT DOCUMENTS

| | | |
|---|---|---|
| JP | H0758625 B2 | 6/1995 |
| JP | 0878042 | 3/1996 |
| JP | 2554113 B2 | 11/1996 |
| JP | 2596572 B2 | 4/1997 |
| JP | 3242205 B2 | 12/2001 |
| WO | 2004/079849 A1 | 9/2004 |
| WO | 2012094672 A2 | 7/2012 |
| WO | 2012135473 A2 | 10/2012 |
| WO | WO 2012135473 A2 * | 10/2012 |
| WO | 2013/027076 A1 | 2/2013 |
| WO | 2013/110421 A1 | 8/2013 |
| WO | 2013/177414 A1 | 11/2013 |

OTHER PUBLICATIONS

Extended European Search Report for European Application No. 09795056 mailed Mar. 31, 2014.

Hagedorn, "NASA Redox Storage System Development Project", U.S. Department of Energy Conservation and Renewable Energy Division of Energy Storage Systems, Final Report, Oct. 1984.

Miyake et al., "Potentiostatic Electrodeposition of Pt Nanoparticles on Carbon Black", Journal of The Electrochemical Society, J. Electrochem. Soc. 2011, vol. 158, Issue 9, pp. D590-D593.

* cited by examiner

OPERATING A REDOX FLOW BATTERY WITH A NEGATIVE ELECTROLYTE IMBALANCE

CROSS REFERENCE TO RELATED APPLICATIONS

The present application is related to and claims priority from U.S. Provisional Patent Application No. 61/747,491, entitled "OPERATING A REDOX FLOW BATTERY WITH A NEGATIVE ELECTROLYTE IMBALANCE," filed on Dec. 31, 2012, the contents of which are incorporated herein by reference in their entirety.

STATEMENT OF FEDERALLY FUNDED RESEARCH

Inventions included in this patent application were made with Government support under DE-OE0000225 "Recovery Act—Flow Battery Solution for Smart Grid Renewable Energy Applications" awarded by the US Department of Energy (DOE). The Government has certain rights in these inventions.

FIELD

This invention generally relates to reduction/oxidation (Redox) flow batteries and more particularly to systems and methods for operating a flow battery with a negative imbalance.

BACKGROUND

Flow batteries are electrochemical energy storage systems in which electrochemical reactants are dissolved in a solvent such as water. The liquid electrolytes are pumped through reaction cells where electrical energy is either converted to or extracted from chemical potential energy in the reactants by way of reduction and oxidation reactions. In applications where megawatts of electrical energy are to be stored and discharged, a redox flow battery system can be expanded to a required energy storage capacity by increasing tank sizes. A flow battery system may be expanded to produce the required output power by increasing the number or size of electrochemical cells or cell blocks. A variety of flow battery chemistries and arrangements are known in the art.

SUMMARY

An embodiment method of operating a flow battery may include controlling operation of at least one component of a flow battery having a positive liquid electrolyte arranged to flow through a positive half-cell of a flow-through reaction cell and a negative liquid electrolyte arranged to flow through a negative half-cell of the flow-through reaction cell. An embodiment method may further include maintaining the flow battery in a negative electrolyte imbalance state in which a quantity of a charged reactant species in the negative liquid electrolyte in the negative half-cell is greater than a charged reactant species in the positive liquid electrolyte in the positive half-cell of the cell of the flow battery based on controlling the operation of the at least one component. An embodiment method may further include maintaining a negative electrolyte imbalance state during at least a charging mode, a discharging mode, and a power-off mode in which electrolytes do not flow and are neither charged nor discharged.

An embodiment method may further include determining that a negative electrolyte imbalance state of the flow battery is less negative than a threshold negative imbalance level. An embodiment method may further include processing at least one of the positive electrolyte and the negative electrolyte to cause the negative electrolyte imbalance state to become more negative. Further in an embodiment method, processing at least one of the positive electrolyte and the negative electrolyte may include decreasing a quantity of a positive charged reactant in the positive electrolyte. In an embodiment method, processing at least one of the positive electrolyte and the negative electrolyte by decreasing a quantity of a positive charged reactant in the positive electrolyte may be performed without changing a quantity of a negative charged reactant in the negative electrolyte Further in an embodiment method, processing at least one of the positive electrolyte and the negative electrolyte may include increasing a quantity of a negative charged reactant in the negative electrolyte. In an embodiment method, processing at least one of the positive electrolyte and the negative electrolyte by increasing a quantity of a negative charged reactant in the negative electrolyte may be performed without changing a quantity of a positive charged reactant in the positive electrolyte.

An embodiment method may further include providing an excess quantity of negative reactant in the negative electrolyte. Further in an embodiment method, processing at least one of the positive electrolyte and the negative electrolyte may include decreasing a quantity of a positive charged reactant in the positive electrolyte and increasing a quantity of a negative charged reactant in the negative electrolyte. Further in an embodiment method, the threshold negative imbalance may be between 0.01M and −0.05M. In a further embodiment method, the threshold negative imbalance may be between about 0.01M and—about 0.05M. Further in an embodiment method, processing at least one of the positive electrolyte and the negative electrolyte to cause the imbalance to become more negative may proceed until the negative imbalance is between 0.05M and −0.20M. Further in an embodiment method, the charged reactant species in the negative electrolyte may be $Cr^{2+}$ and the charged reactant species in the positive electrolyte is $Fe^{3+}$.

A further embodiment method may include maintaining a concentration of charged reactant species in an entire volume of the negative liquid electrolyte at least 0.1M greater than a concentration of charged reactant species in an entire volume of positive liquid electrolyte. A further embodiment method may include providing an excess quantity of negative reactant in the negative electrolyte. Further in an embodiment method, the negative half-cell may include a negative electrode having a catalyst plated on a surface thereof, the method further comprising maintaining an oxidation state of the positive electrolyte and the negative electrolyte such that deplating of the catalyst is inhibited when the cell is discharged to zero volts. Further in an embodiment method, the catalyst may include bismuth, the charged reactant species in the negative electrolyte may be $Cr^{2+}$ and the charged reactant species in the positive electrolyte may be $Fe^{3+}$. Further in an embodiment method, processing at least one of the positive electrolyte and the negative electrolyte to cause the imbalance state to become more negative may be performed by a rebalance sub-system of the flow battery.

A further embodiment method may include, in a charging shut-down mode of the flow battery, stopping a first flow of the negative liquid electrolyte through the negative half cell of the cell of the flow battery while continuously allowing a second flow of the positive liquid electrolyte through the positive half cell of the cell of the flow battery and applying a charging current to the cell. An embodiment method may further include, after a period of time, shutting down the flow battery by stopping the second flow of the positive electrolyte and stopping the charging current to the cell. An embodiment method may further include, in a charging shut-down mode of the flow battery, stopping a first flow of the negative liquid electrolyte through the negative half cell of the cell of the flow battery and stopping a second flow the positive liquid electrolyte through the positive half cell of the cell of the flow battery and applying a charging current to the cell. An embodiment method may further include, after a period of time, shutting down the flow battery by stopping the charging current to the cell. An embodiment method may further include, in a restart mode of the flow battery, stopping a first flow of the negative liquid electrolyte through the negative half-cell of the cell of the flow battery and stopping a second flow the positive liquid electrolyte through the positive half-cell of the cell of the flow battery. An embodiment method may further include, after a first period of time, applying a charging current to the cell with electrolytes stagnant in the cell for a second period of time, and, resuming operation of the flow battery by stopping the charging current to the cell and re-starting the first flow and the second flow.

An embodiment method may further include re-starting one of a charging process, a discharging process or a rebalancing process, before the electrolytes reach a state of zero imbalance due to spontaneous reactions. An embodiment method may further include, in a discharging shut-down mode of the flow battery, stopping a first flow of the positive liquid electrolyte through the positive half cell of the cell of the flow battery, while continuously allowing a second flow of the negative electrolyte through the negative half cell of the cell of the flow battery and removing a discharging current from the cell. An embodiment method may further include, after a period of time, shutting down the flow battery by stopping flow of the negative electrolyte and stopping the discharging current from the cell. An embodiment method may further include, after shutting down the flow battery, initiating a charging process, a discharging process or a rebalancing process before the electrolytes reach a state of zero imbalance due to spontaneous reactions.

Further embodiments may include a flow battery system. Accordingly, an embodiment system may include a first reservoir containing a negative liquid electrolyte. An embodiment system may further include a second reservoir containing a positive liquid electrolyte. An embodiment system may further include a charge/discharge stack. An embodiment system may further include at least one pump for circulating the electrolytes between the reservoirs and the stack. An embodiment system may further include a controller that may include a computer readable storage medium having stored thereon controller executable instructions, which may be configured to cause the controller to perform operations. In an embodiment system, the operations performed by a controller may include maintaining the electrolytes in a negatively imbalanced state. In an embodiment system, the operations performed by a controller may further include maintaining the electrolytes at a negative imbalance of at least 0.1M.

Further in an embodiment system, the charge/discharge stack may include a plurality of cells, each having a porous flow through electrode with a catalyst on a surface thereof. Further in an embodiment system, the catalyst may be bismuth. Further in an embodiment system, the catalyst may include at least one member of the group consisting of bismuth, platinum, gold, lead, silver, titanium, tungsten carbide, zirconium carbide, carbide compounds and nitride compounds. An embodiment system may further include an imbalance monitoring sub system, which may be configured to provide the controller with an analog or digital signal indicative of an imbalance sign and quantity. An embodiment system may further include a rebalance sub system, which may be configured to increase a concentration of a charged negative reactant relative to a charged positive reactant. Further in an embodiment system, the rebalance system may be configured to increase a quantity of negative charged reactant. Further in an embodiment system, the rebalance system may be configured to decrease a quantity of positive charged reactant.

Further in an embodiment system, the stored computer executable instructions may be configured to cause the controller to perform operations, which may include increasing the negative electrolyte imbalance in response to an indication of an insufficient negative imbalance. An embodiment system may further include four tanks in a single pass system. Further in an embodiment system, the stack may be a cascade stack, which may include a plurality of stages arranged in fluidic series. Further in an embodiment system, each stage may be configured to operate at a portion of a total state of charge range of the flow battery system. Further in an embodiment system, the stack may be an engineered cascade stack in which stages designated for lower state of charge operation have different components than stages designated for relatively higher state of charge operation.

An embodiment system may further include a two tank recirculating flow battery system. Further in an embodiment system, the stack may include a plurality of cells and at least one of the cells may have a negative electrode chamber that is larger than a corresponding positive electrode chamber.

In a further embodiment system, a flow battery system may include a first reservoir containing a negative liquid electrolyte. An embodiment system may further include a second reservoir containing a positive liquid electrolyte. An embodiment system may further include a charge/discharge stack having a plurality of individual flow through cells. An embodiment system may further include at least one pump, which may be configured to circulate the electrolytes between the reservoirs and the stack. Further in an embodiment system, each of the cells of the stack may have a negative electrode chamber that is larger than a corresponding positive electrode chamber. Further in an embodiment system, each of the cells may have a ratio of negative electrode chamber volume to positive electrode chamber volume sufficient to maintain an effective negative imbalance condition within the cell at all expected operating conditions. Further in an embodiment system, the stack may be a cascade stack, which may include a plurality of stages arranged in fluidic series. Further in an embodiment system, the stack may be an engineered cascade stack in which stages designated for lower state of charge operation may have different components than stages designated for relatively higher state of charge operation. Further in an embodiment system, the cells of stages designated for lower state of charge operation may have higher ratios of negative electrode chamber volume to positive electrode chamber volume than the cells of stages designated for higher state of charge operation. Further in an embodiment system, the positive electrolyte may contain an Fe reactant and the negative electrolyte may contain a Cr reactant.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
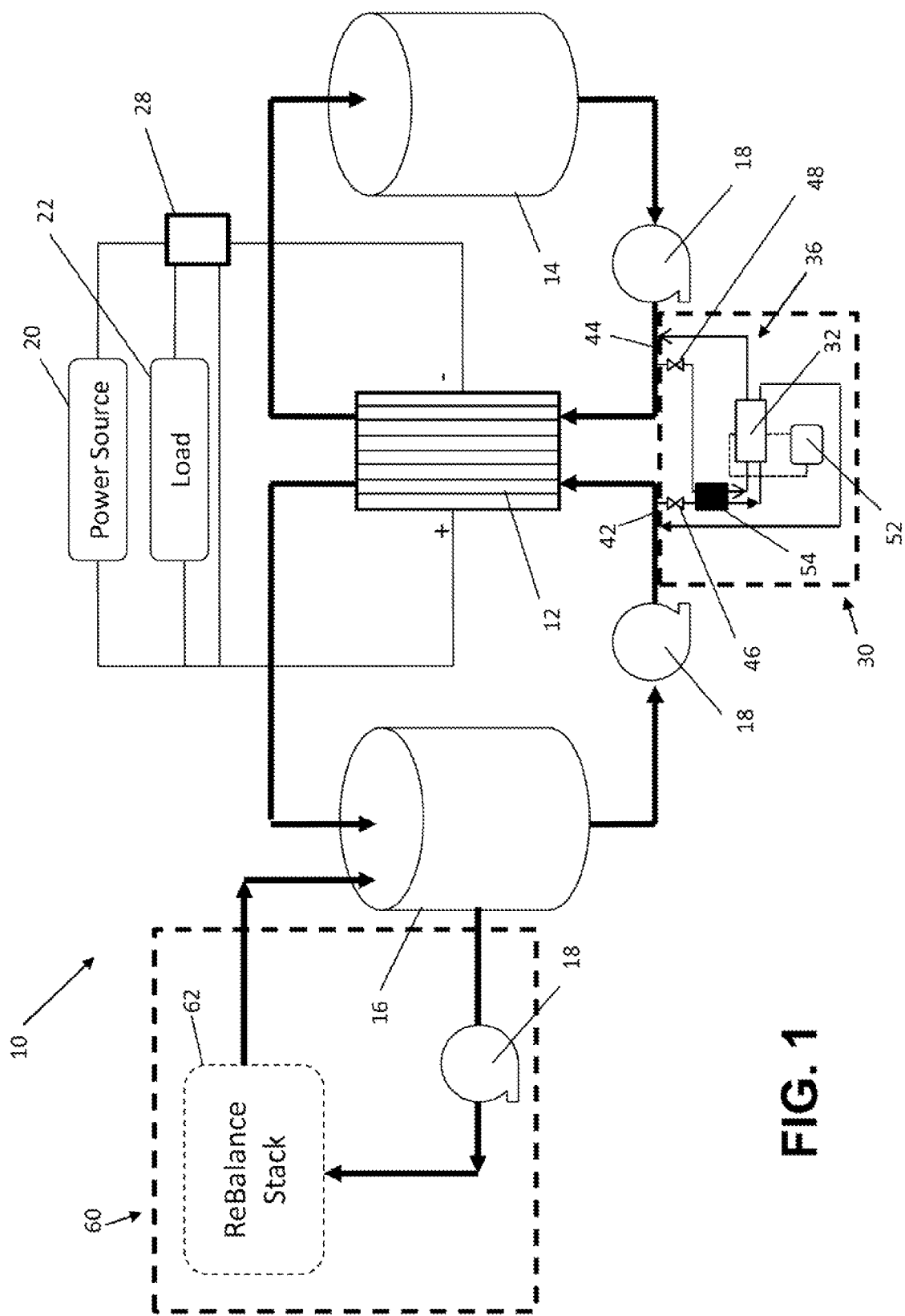
FIG. 1 is a schematic diagram illustrating a redox flow battery system suitable for use in various embodiments.

The various embodiments will be described in detail with reference to the accompanying drawings. References made to particular examples and implementations are for illustrative purposes, and are not intended to limit the scope of the invention or the claims. The embodiments below include systems and methods for operating a redox flow battery with negatively imbalanced electrolytes. Although many of these embodiments are described with reference to Fe/Cr flow batteries, the same principles and concepts may also be applied to other flow battery chemistries and to other catalyst materials beyond those explicitly described in the various examples below.

As used herein, the terms "about" or "approximately" for any numerical values or ranges indicates a suitable temperature or dimensional tolerance that allows the part or collection of components to function for its intended purpose as described herein.

Flow Battery Cells and Stacks

As described herein, terms, including, but not limited to the terms "anolyte," "anode," "catholyte," and "cathode," may be used. Use of such terms may be made with reference to a particular oxidation or reduction reaction based on a discharging process convention. As will be clear to the skilled artisan, because redox flow batteries involve reversible oxidation/reduction reactions, the actual reaction occurring at each electrode may be reversed during a discharge process relative to a charge process. In other words, an electrode that acts as a "cathode" during a charging process will act as an "anode" during discharging. Nonetheless, such components may still be referred to herein by their discharge-reaction names even when discussing charging reactions and processes.

As used herein, the phrase "state of charge" and its abbreviation "SOC" may refer to the ratio of stored electrical charge (measured in ampere-hour) to charge storage capacity of a complete redox flow battery system. In particular, the terms "state of charge" and "SOC" may refer to an instantaneous ratio of usable charge stored in the flow battery to the full theoretical charge storage capacity of the flow battery system. In some embodiments, "usable" stored charge may refer to stored charge that may be delivered at or above a threshold voltage (e.g. about 0.7 V in some embodiments of an Fe/Cr flow battery system). In some embodiments, the theoretical charge storage capacity may be calculated excluding the effects of unbalanced electrolytes.

As used herein the phrase "state of oxidation" and its abbreviation "SOO" refer to the chemical species composition of at least one liquid electrolyte. In particular, state of oxidation and SOO refer to the proportion of reactants in the electrolyte that have been converted (e.g. oxidized or reduced) to a "charged" state from a "discharged" state. For example, in a redox flow battery based on an Fe/Cr redox couple, the state of oxidation of the catholyte (positive electrolyte) may be defined as the percent of total Fe which has been oxidized from the $Fe^{2+}$ form to the $Fe^{3+}$ form, and the state of oxidation of the anolyte (negative electrolyte) may be defined as the percent of total Cr which has been reduced from the $Cr^{3+}$ form to the $Cr^{2+}$ form. Although many of the embodiments herein are described with reference to an Fe/Cr flow battery chemistry, it should be appreciated with the benefit of the present disclosure that some embodiments are applicable to flow battery systems (and some hybrid flow battery systems) using other reactants.

In some embodiments, the state of oxidation of the two electrolytes may be changed or measured independently of one another. Thus, the terms "state of oxidation" and "SOO" may refer to the chemical composition of only one electrolyte, or of both electrolytes in an all-liquid redox flow battery system. The state of oxidation of one or both electrolytes may also be changed by processes other than desired charging or discharging processes. For example, undesired side reactions may cause oxidation or reduction of active species in one electrolyte without producing a corresponding reaction in the second electrolyte. Such side reactions may cause the respective SOOs of the positive and negative electrolytes to become unbalanced such that one electrolyte has a higher effective SOO than the other. The SOO of one or both electrolytes may also be changed by a rebalancing process.

As used herein, the term "rebalancing" may refer to an intentionally directed or controlled process configured to change the SOO of one flow battery electrolyte relative to that of the other, typically in order to bring the ratio of the two SOOs to within a pre-determined range. For example, some rebalancing processes may generally be configured to increase or decrease the SOO of one electrolyte without changing the SOO of the second electrolyte. In other embodiments, rebalancing processes may be configured to increase and/or decrease the SOO of both electrolytes dependently (e.g., by treating both electrolytes together in a single process) or independently (e.g., by treating each electrolyte independent of the other in a separate process).

FIG. 1 illustrates a typical redox flow battery system 10 having an electrochemical stack 12, which may be configured to convert electrical energy from an electric power source 20 into chemical potential energy in liquid electrolytes flowed through the stack 12 by pumps 18 and stored in a negative electrolyte (anolyte) tank 14 and positive electrolyte (catholyte) tank 16. The stack 12 may also be configured to convert chemical potential energy from the flowing liquid electrolytes into electric power for delivery to an electric load 22.

In some embodiments an electronic control system 28 may be provided, for example, to control the switching of charging from a source and discharging to a load, as well as controlling the battery's operation mode, the operation of pumps, valves, and sub-systems such as a rebalancing system 60 or an electrolyte monitoring system 30. The electronic control system may be configured to control any other battery system or peripheral functions as needed. In some embodiments, the stack 12 includes a plurality of individual electrochemical reaction cells (or blocks of cells) joined hydraulically and electrically in parallel and/or series combinations in order to meet requirements. Examples of such stacks are shown and described in U.S. Pat. No. 7,820,321 ("the '321 patent"), U.S. Patent Application Publication No. 2011/0223450 and U.S. Patent Application Publication No. 2011/0117411, all of which are incorporated herein by reference in their entirety. Any references to "a cell" or "cells" herein are not limited to any specific number of cells, and may include any number of flow battery reaction cells or blocks of multiple cells in any arrangement.

In some embodiments, a flow battery system 10 may incorporate an electrolyte concentration monitoring system 30 for detecting an electrolyte imbalance as described in further detail below. Various embodiments of flow-battery-integrated concentration or imbalance monitoring systems 30 may be configured with various fluid delivery arrangements. One example of an electrolyte monitoring system is described in co-pending U.S. patent application Ser. No. 13/432,243 entitled "Monitoring Electrolyte Concentrations in Redox Flow Battery Systems" (referred to herein as "the '243 application"), published as U.S. Patent Application Publication No. 2013/0084506, the contents of which are hereby incorporated by reference. Other electrolyte monitoring systems are described below, and yet others are known to those skilled in the art.

In some embodiments, the electrolyte concentration monitoring system 30 may include a fluid delivery apparatus 36 for directing liquid electrolytes from the flow battery system 10 into a testing device 32. In some embodiments, the testing device 32 may be joined in fluid communication with electrolyte conduits 42, 44 downstream from electrolyte pumps 18 and upstream from the stack 12. In such embodiments, valves 46, 48 may be provided to selectively direct electrolytes through the testing device 32 during normal pumping of electrolytes through the flow battery system 10. In alternative embodiments, fluidic connections for directing electrolyte through the testing device 32 may be independent of battery pumping apparatus. In some embodiments, the fluid delivery apparatus 36 may be configured to pump electrolytes directly from the tanks 14, 16 into the testing device 32. In some embodiments, the electrolyte concentration monitoring system 30 may include an electronic controller 52 for controlling an electrolyte monitoring operation. In some embodiments, the electrolyte concentration monitoring system 30 may also include a pre-mixing device 54 for mixing a small quantity of positive and negative electrolyte prior to testing. A pre-mixing device may be used to effectively "discharge" the electrolytes prior to testing. In other embodiments, alternative methods of discharging the electrolytes prior to testing may be used.

In some embodiments, the redox flow battery system 10 may include the rebalancing system 60, which may be integrated and joined in fluid communication with one or more electrolyte tanks 14, 16. The rebalancing system 60 may include a rebalance stack 62, which may include one or more reaction cells (not shown) configured to perform a rebalancing process. In FIG. 1, the rebalance system 60 may be joined to the positive electrolyte tank 16. In alternative embodiments, the rebalance system 60 may be joined to the negative electrolyte tank 14 or to both the positive and the negative electrolyte tanks 14, 16. In some embodiments, the rebalance system 60 as shown for example in FIG. 1, may be configured to draw electrolyte from the tank 14, perform a rebalancing process and then return the rebalanced electrolyte to the tank 14. In alternative embodiments, the rebalance system 60 may be positioned and configured to withdraw electrolyte from the tank 14, and then return the electrolyte directly into an electrolyte conduit (not shown) directing the electrolyte into the stack 12 before returning to a storage tank.

In some embodiments, the stack 12 may include a plurality of cell blocks joined to one another in a cascade arrangement such that electrolyte flows in fluidic series from one cell to another or from one cell block to another. For example, the '321 patent referenced above describes embodiments of engineered cascade redox flow battery systems in which cells and/or stacks are arranged in cascade orientations, such that electrolyte flows in series from a first stage to an nth stage (where n is any number greater than one) along a common flow path. In those engineered cascade systems, a state-of-charge gradient exists between the first stage and the nth stage, and components of the electrochemical cells are optimized based on the state-of-charge conditions expected at those cells. Such systems provide for improved overall energy efficiency relative to cascade stacks in which all cells are configured the same.

Although, in embodiments described herein, the redox flow battery system 10 of FIG. 1 is shown and described with two tanks 14, 15, the systems and processes described herein below may also be used in three-tank systems, four-tank systems, or in systems with additional tanks. In some embodiments, the benefits of a four-tank system may be achieved by using two tanks, each having a divider. Examples of redox flow battery systems with divided tanks are shown and described in U.S. Pat. No. 7,820,321.

Figure 2:
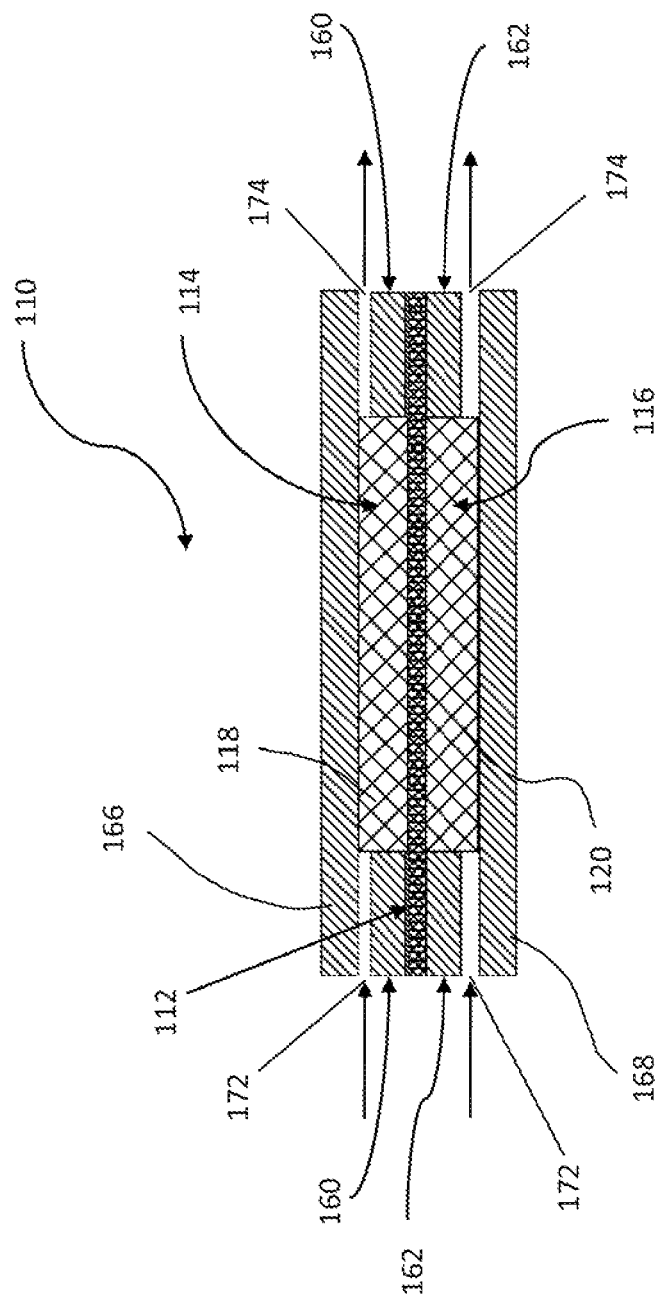
FIG. 2 is a diagram illustrating a cross-sectional view of an example redox flow battery cell suitable for use in various embodiments.

FIG. 2 shows a cross-sectional view of a single electrochemical cell 110 of a flow battery stack (e.g., stack 12 in FIG. 1) in various embodiments. The cell 110 may generally include a positive electrode space 114 separated from a negative electrode space 116 by a separator membrane 112. The separator membrane 112 may be an ion selective membrane, a microporous membrane or any other separator membrane suitable for use in a flow battery cell. In some embodiments, the positive 114 and negative 116 electrode spaces may be entirely filled by respective electrically conductive (and typically non-reactive) positive and negative porous electrodes 118, 120. In an embodiment, the membrane separator 112 may be sandwiched between and supported by a pair of separator support plates 160, 162. A pair of backing plates 166, 168, which may be at least partially made of a non-reactive electrically conductive material, may surround and enclose the positive and negative electrode spaces 114, 116. Inlet ports 172 may direct positive and negative electrolytes into the positive and negative electrode spaces 114, 116 respectively, and outlet ports 174 may carry electrolytes out of the cell.

Flow Battery Electrolytes

Flow battery electrolytes are typically made by dissolving precursors for electrochemical reaction active materials, such as particular compounds of iron, chromium, vanadium, titanium, bromine, zinc, etc. in an aqueous acid solution. Strong acids are typically used as supporting electrolytes because of the superior mobility of $H^+$ ions. In some embodiments, "mixed reactant" flow battery electrolytes may be formulated such that both positive and negative electrolytes are identical in a fully discharged form. In such embodiments, a single electrolyte solution may be prepared with discharged electrolytes of both active species.

Thus for example, in some redox flow battery systems based on the Iron/Chromium (Fe/Cr) redox couple, the catholyte (positive electrolyte) may contain $FeCl_3$ and $FeCl_2$ dissolved in a supporting electrolyte or aqueous acid solution such as HCl. The anolyte (negative electrolyte) may contain $CrCl_3$ and $CrCl_2$ in a supporting electrolyte or aqueous acid solution such as HCl. Such a system is known as an "unmixed reactant" system. In a "mixed reactant" system, the anolyte may also contain $FeCl_2$, and the catholyte may also contain $CrCl_3$.

Mixed reactant electrolytes generally have the property that the fully discharged form of the positive electrolyte has the same composition as the fully discharged form of the negative electrolyte. In further embodiments, electrolytes in an "unequal mixed reactant" system may include unequal concentrations of $FeCl_2$ and $CrCl_3$. In some such embodiments, an unequal mixed reactant electrolyte may be prepared with a higher concentration of $CrCl_3$ than $FeCl_2$. One reason for preparing a mixed electrolyte with higher $CrCl_3$ concentration is to mitigate the generation of $H_2$. In a case where the generation of $H_2$ is not a concern for various reasons, the degree to which the concentration of $CrCl_3$ is greater than the concentration of $FeCl_2$ may be reduced. Additional reasons as discussed in greater detail herein below, is to prepare the concentration of $CrCl_3$ based on the amount of negative imbalance to be established. For example, in some embodiments, the quantity of $CrCl_3$ may be between 1% and 20% greater than the quantity of $FeCl_2$. In other embodiments, for example, where measurements of the relative concentrations of reactants may be quickly and accurately made, a quantity of $CrCl_3$ may be as low as around 0.5% greater than the quantity of $FeCl_2$ in order to establish or maintain a negative imbalance.

In flow battery examples in which charge and discharge reactions are perfectly reversible, the electrolytes will always be in balance, with the quantity of charged active material in the positive electrolyte (e.g., $Fe^{3+}$) exactly equal to the quantity of charged active material in the negative electrolyte (e.g., $Cr^{2+}$). In reality, side reactions typically make the quantity of one of the reactants on one side larger than its counterpart on the other side, causing an imbalance in capacity. For an iron-chrome battery for instance, the quantity of $Fe^{3+}$ in the catholyte tends to be higher than the quantity of $Cr^{2+}$ in the anolyte because of a Hydrogen side reaction in the anolyte. In the state where the charged active materials are unequal, the system is said to be unbalanced and the energy storage capacity of the battery decreases. Typically, an unbalanced system may be rebalanced to regain the energy storage capacity. Insufficient rebalancing may still leave more charged active material (e.g., $Fe^{3+}$) in the positive electrolyte than charged active material (e.g., $Cr^{2+}$) in the negative electrolyte, leading to a condition that will be referred to herein as positive imbalance. Additional rebalancing may result in less charged active material (e.g., $Fe^{3+}$) in the positive electrolyte than charged active material (e.g., $Cr^{2+}$) in the negative electrolyte, leading to a condition that will be referred to herein as negative imbalance.

The unbalanced state may be corrected by processing the catholyte in a rebalancing cell. Several rebalancing systems have been used in the past, including an Iron/Hydrogen fuel cell as described in U.S. Pat. No. 4,159,366. Other examples of rebalance systems are provided in co-pending U.S. patent application Ser. No. 13/433,189 entitled "Rebalancing Electrolytes In Redox Flow Battery Systems," corresponding to U.S. Patent Application Publication No. 2013/0084482, (referred to herein as "the '189 application"), the contents of all of which are hereby incorporated by reference in their entirety.

In a Fe/Cr flow battery system, a "positive electrolyte imbalance" refers to a condition in which the positive electrolyte contains a higher quantity of charged active material (e.g., $Fe^{3+}$) than the quantity of charged active material (e.g., $Cr^{2+}$) in the negative electrolyte. The opposite condition is "negative electrolyte imbalance", referring to a higher charged active material quantity (e.g., $Cr^{2+}$) in the negative electrolyte than the quantity of charged active material (e.g., $Fe^{3+}$) in the positive electrolyte. In the case of an Fe/Cr flow battery, positive electrolyte imbalance occurs naturally because of side reactions. In contrast, negative imbalance typically only occurs as a result of "excessive" rebalancing of one or both electrolytes past a point of perfect balance, or by some other directed action.

In various embodiments, the degree and/or direction (positive or negative) of any electrolyte imbalance may be monitored or measured using any suitable method. For example, imbalance may be characterized and quantified using a specially-configured small-volume test cell and/or a reference electrode as described in more detail in the '243 application referenced above. In other embodiments, the concentrations of active materials in one or both electrolytes may be measured using spectroscopy methods well understood by those skilled in the art.

The term "catalyst" or "catalyst material" is used herein as a generic term to refer to substances which accelerate desirable chemical and/or electrochemical reactions within a flow battery system as well as substances which may be selected to reduce or prevent the occurrence of undesirable chemical or electrochemical reactions. In general, as used herein, a "catalyst" may include any substance to be plated, coated or otherwise placed onto a surface of a redox flow battery electrode.

Bismuth metal plated on negative flow battery electrodes has been used as a catalyst and as a hydrogen generation suppressor. If bismuth is lost from the negative electrode, the cell may develop a higher resistance, and may generate more hydrogen. When an Fe/Cr flow battery system is left at open-circuit, it self-discharges. With balanced or positively imbalanced electrolytes, this self-discharge causes a loss of bismuth. In some cases, in order to prevent the loss of bismuth with a positive or zero electrolyte imbalance, either the cells may be continuously charged at a low current (i.e., a "trickle charge"), or the charged electrolytes may be pumped through the cells continuously at a low flow rate. Both of these methods are undesirable because they result in lower overall system efficiency due to the energy consumption required. If the catalyst (e.g., bismuth) is allowed to be depleted during an idling period, then a plating step must typically be done prior to any charge or discharge operation in order to re-establish a desired catalyst surface. This additional step introduces more complexity and long delay times.

In other embodiments, other catalyst materials may be coated or plated onto the surface of one or both electrodes. The composition and quantity of such catalyst materials may vary depending on the needs of a particular flow battery system. For example, other catalyst materials may include platinum, gold, lead, silver, titanium, tungsten carbide, zirconium carbide, or other carbide and nitride compounds. For example, U.S. Pat. No. 4,543,302 describes a method of coating the negative electrode of a flow battery cell with bismuth (Bi), U.S. Pat. No. 4,270,984 describes a method of coating the negative electrode surface of a flow battery cell with lead (Pb), and U.S. Pat. No. 4,882,241 describes a method of coating the negative electrode of a flow battery cell with a combination of Au, Ti, Pb, & Bi. Many of such alternative catalyst materials are also susceptible to being lost during self-discharge of a flow battery cell.

In some embodiments, a better method of preventing the loss of bismuth or other catalyst materials involves maintaining a negative electrolyte imbalance during the operation of the flow battery. By doing so, the bismuth on the negative electrode is stable and will not be lost, even when the cell self-discharges to 0 V.

In some embodiments, a desired electrolyte imbalance may be achieved and maintained by actively processing one or both electrolytes (e.g., by a "rebalancing" process). In other embodiments, a desired negative electrolyte imbalance may be achieved and maintained passively within a suitably configured cell. The following description is generally divided into these two approaches.

Maintaining Negative Imbalance by Active Processing

Figure 3:
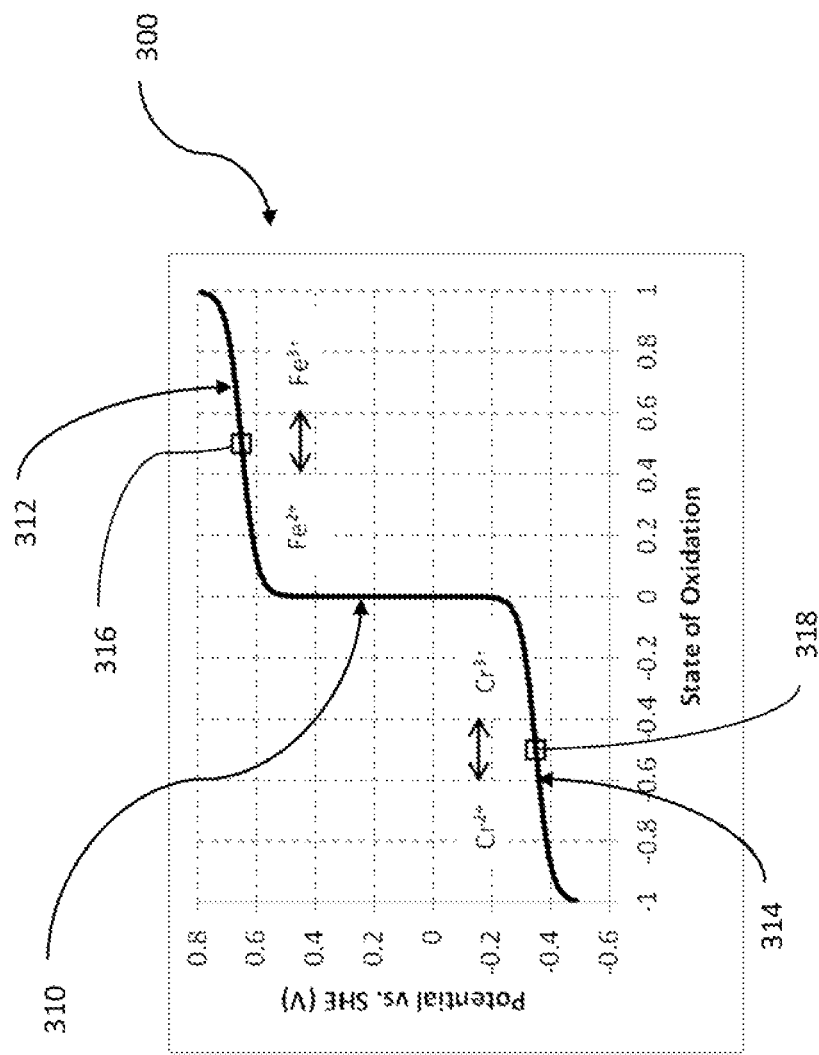
FIG. 3 is a graph illustrating a state-of-oxidation vs. electric potential relationship between SOO and potential of reactants in an Fe/Cr flow battery in various embodiments.

FIG. 3 is a graph 300 of potential relative to a standard hydrogen electrode (SHE) vs. state of oxidation for the two electrolytes in an Fe/Cr flow battery. The shape of the curve 310 may be derived from the Nernst equation as described in further detail in the '243 application referenced above. The upper plateau 312 of the curve represents the $Fe^{3+}/Fe^{2+}$ couple, and the lower plateau 314 represents the $Cr^{3+}/Cr^{2+}$ couple. Similar charts may be produced for any set of flow battery active materials.

The x-coordinate of the graph 300 is SOO (state of oxidation), which is defined as the proportion of the charged specie to the total quantity of that chargeable material. In equation form, the positive and negative SOOs for an Fe/Cr flow battery are as follows:

$$SOO(positive) = Fe^{3+}/total\ Fe \qquad EQ(1)$$

$$SOO(negative) = -Cr^{2+}/total\ Cr \qquad EQ(2)$$

The curve 310 may also be plotted with active material concentrations on the horizontal axis instead of SOO. If the total Fe concentration and the total Cr concentration are equal, then the shapes of the curves are the same whether it is based on concentration or SOO. For simplicity, the examples described herein with reference to FIGS. 3-6 assume mixed reactant electrolytes with equal total Fe and total Cr concentrations.

In normal operation, the positive electrolyte is represented by a point on the upper part of the curve (e.g., as represented by the box 316). The negative electrolyte is represented by a point on the lower part (e.g., as represented by the box 318). During charge, the two points move away from each other along the curve 310. During discharge, the two points move toward each other.

If the electrolyte contains a small amount of a bismuth compound, such as $BiCl_3$, there is an additional redox reaction:

$$Bi^{3+} + 3e^- \rightarrow Bi \qquad EQ(3)$$

For EQ(3), $E^0 = 0.150$ in solution with high chloride concentration.

Figure 4:
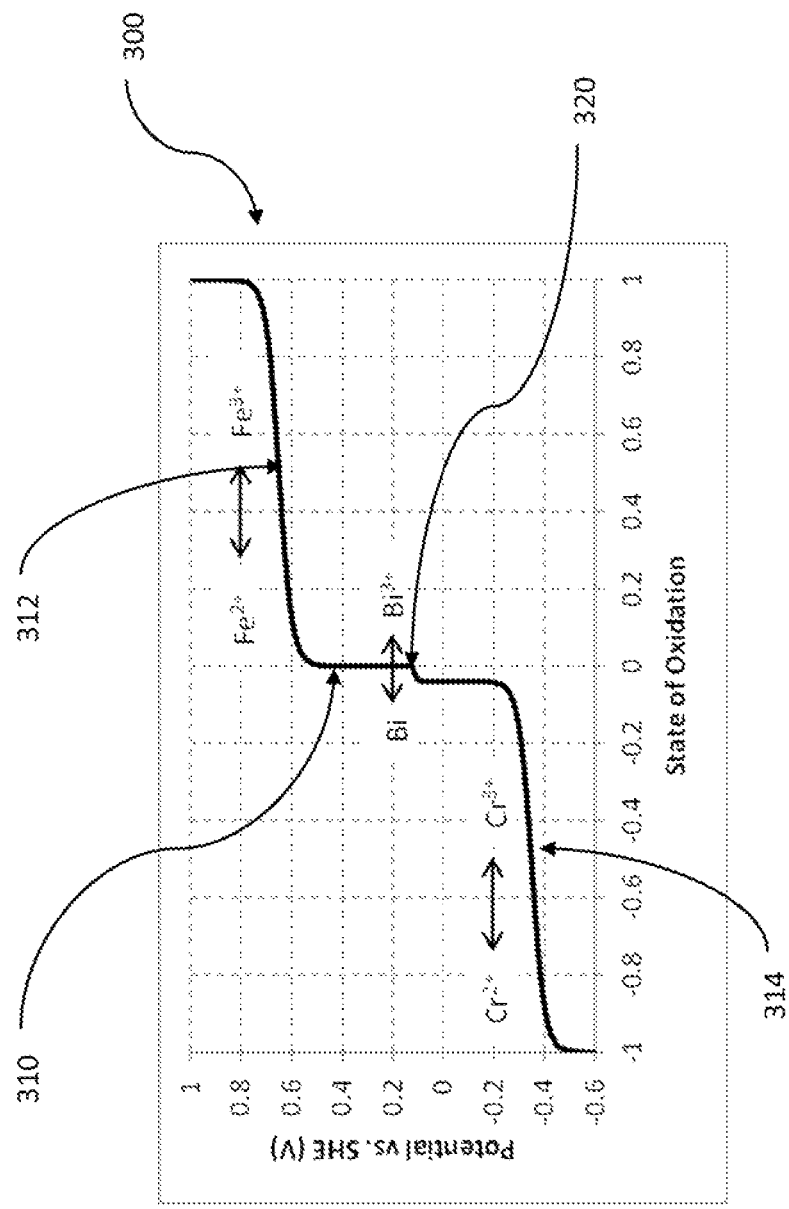
FIG. 4 is a graph illustrating a state-of-oxidation vs. electric potential relationship between SOO and potential of reactants in an Fe/Cr flow battery with a bismuth catalyst on the negative electrode in various embodiments.

During the initial charge, the bismuth compound redox reaction of EQ(3) will give rise to an additional plateau 320 in the potential vs. SOO curve 310, as shown in FIG. 4. The width of the plateau 320 is proportional to the quantity of Bi in the electrolyte. In order to clearly illustrate the bismuth plateau 320, the example of FIG. 4 includes a higher quantity of bismuth than would be used in most cases. In the illustrated example, the plateau 320 may correspond to a bismuth-to-iron mole ratio of Bi/Fe=0.013. In other more common examples, the amount of Bi may be much smaller (e.g., on the order of about Bi/Fe=0.001). The various embodiments described herein may be used with any quantity of bismuth or other catalyst materials.

The curve of FIG. 4 also shows that Bi metal is stable in the electrolyte only if the electrolyte potential is below about 0.1V. This is visible from the fact that when a cell containing stagnant electrolyte self-discharges, the $Fe^{3+}$ in the positive electrolyte and the $Cr^{2+}$ in the negative electrolyte diffuse across the separator and react with each other. If the electrolyte imbalance is even slightly positive, some excess $Fe^{3+}$ is left over after all the $Cr^{2+}$ is consumed. This excess $Fe^{3+}$ causes the loss of Bi metal on the carbon felt through the following spontaneous reaction:

$$Bi + 3Fe^{3+} \rightarrow Bi^{3+} + 3Fe^{2+} \qquad EQ(4)$$

For EQ(4), $E^0 = +0.50$.

On the other hand, if the electrolyte imbalance is negative, some excess $Cr^{2+}$ is left over in the cell after the cell self-discharges. For example, $Cr^{2+}$ may be left over after all of the $Fe^{3+}$ in the positive electrolyte in the cell reacts with some of the $Cr^{2+}$ in the negative electrolyte in the cell. Because $Cr^{2+}$ does not react with Bi metal, the excess $Cr^{2+}$ protects the Bi metal against some other oxidizing agents that may be present in the cell, such as oxygen, by reacting with the oxidizing agent first. If the quantity of excess $Cr^{2+}$ is greater than the quantity of other oxidizing agents, the catalyst layer may be preserved.

In further embodiments, other catalyst materials coated or plated on the surface of one or both electrodes may be protected by maintaining electrolytes at a negative imbalance. The surface of one or both electrodes may include quantities of various other catalysts or other materials, depending on the characteristics of a particular flow battery system. Therefore, although several embodiments herein are described with Bi metal as a catalyst material, it should be understood that the same methods, processes and apparatus may be used in combination with any other flow battery catalyst material as desired. In such embodiments, the degree of negative imbalance needed to maintain a given catalyst material may be more or less negative than the examples provided herein.

Figure 5:
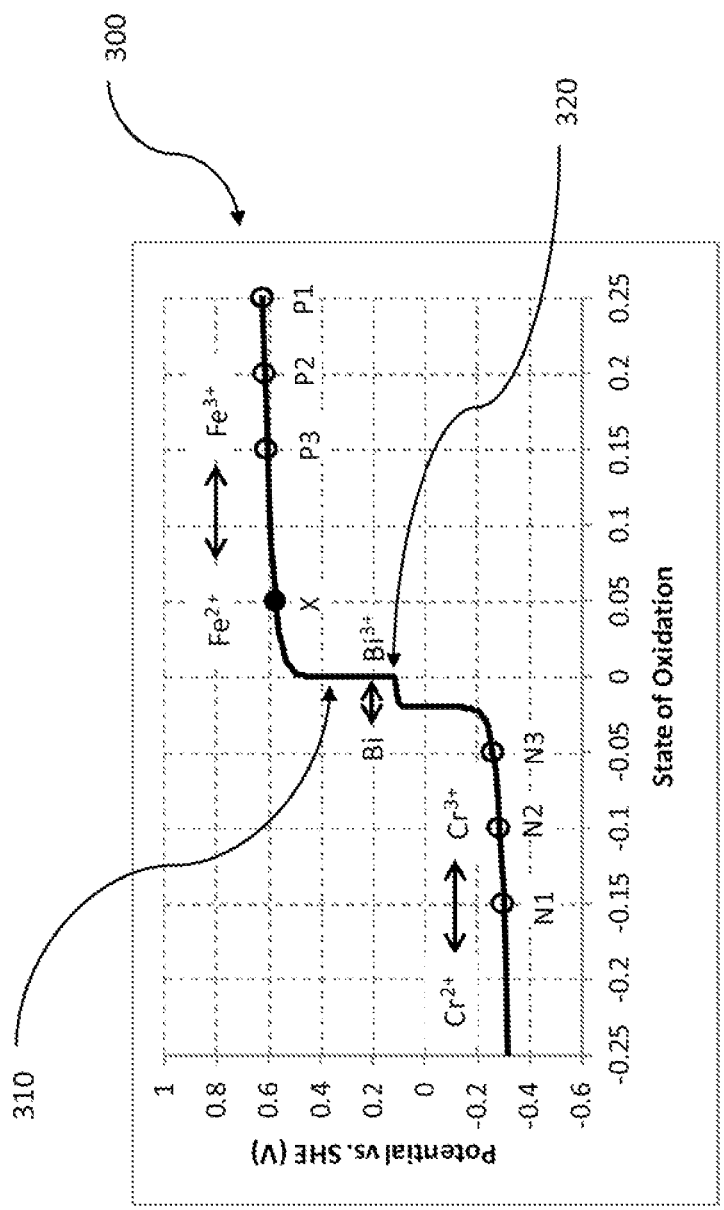
FIG. 5 is a graph illustrating a state-of-oxidation vs. electric potential relationship between SOO and potential of reactants during self-discharge of in an Fe/Cr flow battery with a positive electrolyte imbalance and a bismuth catalyst on the negative electrode in various embodiments.
Figure 6:
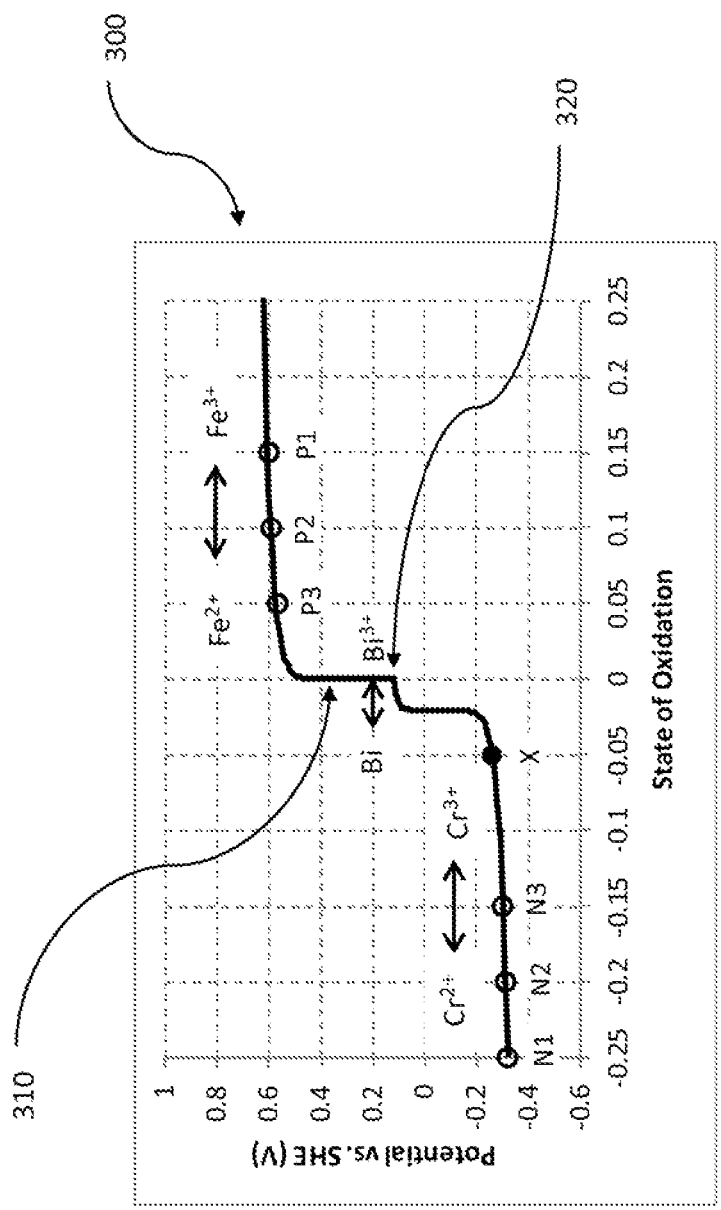
FIG. 6 is a graph illustrating a state-of-oxidation vs. electric potential relationship between SOO and potential of reactants during self-discharge of in an Fe/Cr flow battery with a negative electrolyte imbalance and a bismuth catalyst on the negative electrode in various embodiments.

The above process can be more quantitatively understood from the examples shown in FIG. 5 and FIG. 6. In both examples, the state of positive electrolyte before self-discharge is represented by point P1, and state of the negative electrolyte before self-discharge is represented by point N1. During self-discharge, the electrolyte states move toward the middle. The positive electrolyte state moves to point P2, then to P3. The negative electrolyte state moves to point N2, then to N3. At each point, the total cell voltage is the difference between the positive electrolyte potential and the negative electrolyte potential. Eventually the cell will discharge to zero volt when the difference between the positive electrolyte potential and the negative electrolyte potential reaches zero. When the cell voltage reaches zero volt, the compositions of the two electrolytes become the same, and are represented by the same point X on the curve 310. The state of oxidation at point X is the average of the SOOs of the two original points P1 and N1. In other words, the location of point X along the curve 310 indicates and is dependent on the imbalance of the electrolytes prior to self-discharge.

FIG. 5 shows a system with a positive imbalance of 0.1M. The positive electrolyte is represented by point P1 ($Fe^{3+}$=0.25M), the negative by point N1 ($Cr^{2+}$=0.15M). The SOO of X is +0.05. The potential at point X is +0.58V, which is well above the potential of the bismuth plateau. This means that, after the cell self-discharges completely, the bismuth metal on the negative electrode will be oxidized to $Bi^{3+}$.

FIG. 6 shows a system with a negative imbalance of −0.1M. The positive electrolyte is represented by point P1 ($Fe^{3+}$=0.15M), the negative by N1 ($Cr^{2+}$=0.25M). The SOO of X is −0.05, and the potential at point X is −0.26V, which is well below the potential of the bismuth plateau. This means that, after the cell self-discharges completely, the bismuth metal on the negative electrode will be preserved.

In some embodiments, a negative imbalance of flow battery electrolytes may be achieved by performing a "rebalancing" operation on one or both electrolytes to reach a condition in which the negative electrolyte contains a higher concentration of charged active material (e.g., $Cr^{2+}$) than the charged active material concentration (e.g., $Fe^{3+}$) in the positive electrolyte. Some rebalancing processes involve "discharging" the positive electrolyte independent of the negative electrolyte, while other rebalancing processes involve "charging" the negative electrolyte independent of the positive electrolyte. In other embodiments, a negative imbalance of flow battery electrolytes may be at least initially achieved by preparing electrolyte solutions whereby, in an initial state, the negative electrolyte contains a higher concentration of charged active material than the charged active material in the positive electrolyte. However, if side reactions tending to cause a positive imbalance are expected during operation of the flow battery, further processing may be required in order to maintain a negative electrolyte imbalance.

Figure 7:
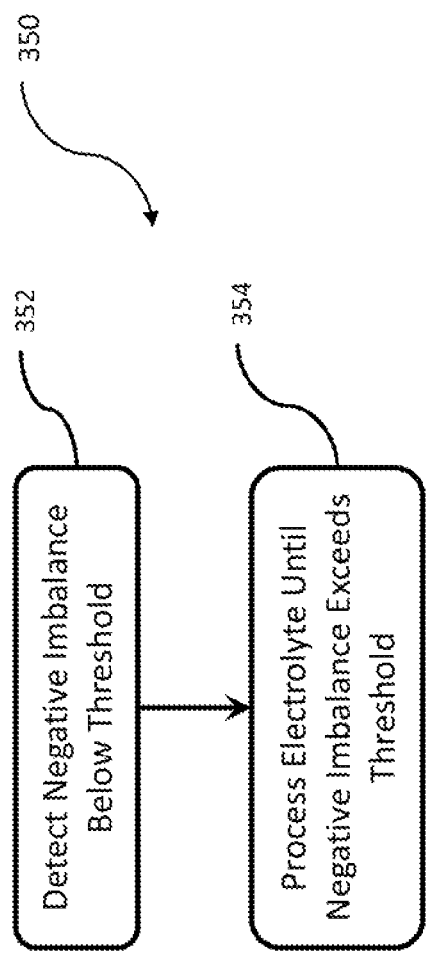
FIG. 7 is a process flow diagram illustrating an embodiment process for maintaining flow battery electrolyte solutions at a negative imbalance.

FIG. 7 illustrates an embodiment process 350 for maintaining a negative electrolyte imbalance by processing at least one electrolyte. In some embodiments, the process 350 may comprise detecting, in block 352, that an electrolyte imbalance is less negative than a threshold value (e.g., insufficient negative imbalance). When a negative imbalance less negative than a threshold is detected, a rebalancing process may be initiated in block 354 to cause the imbalance to become more negative (e.g. increase negative imbalance). For example, if a threshold value is about −0.1M, then an imbalance of −0.01M may trigger the start of a rebalancing process to increase the negative imbalance. The rebalancing process 350 may treat one or both electrolytes until the electrolytes have a negative imbalance that is more negative than a desired stop-point or threshold value. Using the above example, the rebalance process 350 may proceed until the imbalance is determined to be about −0.15M. In an example, the threshold negative imbalance value may be between −0.01M and −0.05M. Processing one electrolyte may cause the imbalance to become more negative until the negative imbalance is between −0.05M and −0.20M.

In some cases, depending on the rebalancing and/or imbalance measurement processes being used, start and/or stop thresholds may include an additional margin to account for measurement uncertainty and/or time lag between a measured imbalance and a range of possible actual imbalance values. In various embodiments, a degree of negative imbalance to be maintained may be at least partly determined based on a known range of uncertainty in an imbalance measurement. For example, depending on the measurement method used, an electrolyte imbalance measurement may have an uncertainty of +/−0.01M or more. In such embodiments, it may be desirable to establish start and stop threshold values to maintain a desired degree of negative imbalance even in the cases in which an imbalance measurement is significantly incorrect.

For example, if a measured imbalance value is known to have a maximum uncertainty or error (whether due to an imprecise measurement technique, time lag or any other cause) of +/−0.015 M, then in order to prevent a negative imbalance from becoming less negative than −0.01 M, a process 354 may be started if the imbalance is measured to be −0.025 M. In some cases, if the rate at which imbalance becomes more positive during normal flow battery operation is such that the imbalance is likely to become substantially more positive before a new measurement can be obtained, it may be desirable to begin a process 354 if a negative imbalance of −0.03 or even more negative. Similarly, if the flow battery is configured such that a maximum negative imbalance before losing capacity is −0.2M, then a process 354 may be stopped when a measured imbalance is −0.185 or more negative.

Some imbalance measurement processes may take a substantial amount of time to complete. For this and other reasons, it may be impractical to rely on a measurement process for precisely determining whether a desired "stop-point" has been reached. Therefore, in some cases a system may be configured to define a stop point in terms of time or a number of processing cycles. For example, a time required to change an imbalance from a first value to a second value may be determined based for a known rebalance rate proceeding from a known imbalance point. For example, a known imbalance may be based on a measurement taken before or during a rebalance process. In some cases, a coulometric rebalance rate may be determined based on the known electrochemistry of the rebalance process. With a known coulometric rebalance rate, a new imbalance value may be estimated at any point during a rebalance process by measuring a quantity of coulombs delivered to a rebalance system. A coulomb is the SI quantity of electric charge equal to the quantity of electricity conveyed in one second by a current of one ampere. Therefore, by applying a known electric current to a known rebalance system (or other electrolyte processing system) for a known duration of time, a new imbalance value may be estimated from a measured starting point.

In some cases, a start point at which to begin a process 354 may be based on a number of charge/discharge cycles or a duration of operation instead of a measured imbalance value. For example, in some cases a rate at which side-reactions cause electrolyte imbalance to become more positive may be known, such as by observation from periodic measurements over many charge/discharge cycles or over a long period of operation (e.g., days, weeks, months or years). Thus, for example, if it is known based on observation of past performance of a particular flow battery system that the electrolytes tend to become more positively imbalanced at a rate of about 1% for each charge/discharge cycle during normal operation, then a process for making the imbalance more negative by at least 1% may be performed after every charge/discharge cycle. Alternately, a process to cause the electrolyte imbalance to become more negative by at least 5% may be performed every five charge/discharge cycles. Using this or other methods, the frequency and/or duration of rebalancing (or other process for increasing a negative imbalance) may be adjusted based on observed performance of a particular flow battery system.

In various embodiments, a maximum target negative imbalance may be at least partly based on an excess quantity of a negative reactant material. For example, as described in U.S. patent application Ser. No. 13/433,189, Fe/Cr flow battery electrolytes may be configured with an excess quantity of Cr in order to extend the charge capacity of a flow battery system in order to mitigate the effect of side reactions. In one example, an Fe/Cr flow battery may be configured with electrolytes containing 1.3M Fe and 1.5M Cr in 1M HCl. In such a system, the concentration of Cr in the electrolytes is greater than the concentration of Fe by 0.2M. In the absence of any significant side reactions, a negative imbalance of −0.2M would not reduce the battery's capacity. However, a negative imbalance of −0.3M would reduce the capacity of the battery by the same amount as a positive imbalance of 0.1M due to the reduced availability of charge-able $Cr^{3+}$. In reality, a hydrogen generation side reaction is likely, and therefore the degree of negative imbalance to be maintained should be balanced with the potential for loss of battery capacity.

Thus, in various embodiments, for a pair of electrolytes with an excess quantity of negative reactant of about 0.2M, a start-point threshold value 352 may be between about 0.0M and about −0.5M, or in more specific cases between about −0.01M and about −0.03M. Similarly, a threshold imbalance value at which processing, for example in block 354, should stop may be between about −0.03M and about −0.2M and in more specific cases between about −0.05M and about −0.1M.

In some embodiments, the process 350 may include processing a positive electrolyte by effectively independently discharging the positive electrolyte through one or more chemical or electrochemical reactions. Processing the positive electrolyte may involve decreasing a concentration of a positive active material in the positive electrolyte without altering the concentration of a negative active material in the negative electrolyte.

In other embodiments, the process 350 may comprise processing a negative electrolyte by effectively independently charging the negative electrolyte through one or more chemical or electrochemical reactions. Processing the negative electrolyte may involve increasing the concentration of charged negative active material in the negative electrolyte without altering the concentration of charged positive active material in the positive electrolyte.

In further embodiments, the process 350 may comprise separately but simultaneously processing both electrolytes by effectively charging the negative electrolyte and effectively discharging the positive electrolyte through one or more chemical or electrochemical reactions to achieve an increasingly negative imbalance.

In some embodiments, the process 350 may include detecting an imbalance based on electrolyte drawn directly from a charged electrolyte storage tank. In other embodiments, the process 350 may include detecting an imbalance based on electrolytes flowing through a conduit away from a flow battery stack (e.g., stack 12 in FIG. 1) and towards an electrolyte storage tank. In further embodiments, the process 350 may include detecting an imbalance based on electrolytes flowing through a conduit away from a storage tank and towards a flow battery stack. In various embodiments, the process 350 may be initiated at the end of a charging cycle, at the beginning of a charging cycle, at the end of a discharging cycle, at the beginning of a discharging cycle, during a charging cycle or during a discharging cycle.

As described above, in some embodiments, the flow battery system 10 may be configured with electrolytes prepared according to an unequal mixed reactant configuration. In such embodiments, in an initially prepared and fully discharged state, the electrolyte may contain an excess quantity of a discharged negative reactant (e.g., $Cr^{3+}$) relative to a quantity of a discharged positive reactant (e.g., $Fe^{2+}$). In some embodiments of such systems, it may be particularly desirable to achieve and maintain a negative imbalance at least partially by charging the negative electrolyte. The excess quantity of the negative reactant may allow for the negative imbalance to be maintained without reducing the capacity of the flow battery system as a whole.

Maintaining Negative Electrolyte Imbalance with a Charging Process

In some embodiments, a desired negative electrolyte imbalance may be achieved and maintained within the stack cells immediately prior to shut-down of the battery system by using the existing charging capability of a flow battery system. For example, a charging current may be applied to the stack cells while only the positive electrolyte is pumped through the stack and while the negative electrolyte is stationary in the stack cells. The battery may then be shut down by stopping the flow of electrolyte and switching off the charging current. When the battery is shut down following such a process, the volume of negative electrolyte in the negative half-cell chambers will have a higher absolute value of SOO than the volume of positive electrolyte sitting in the positive half-cell chambers. In such embodiments, a negative imbalance may be maintained within the cells while the battery is shut down, regardless of the state of balance or imbalance of the electrolytes throughout the rest of the system.

In some embodiments, a flow-interruption process may be applied when shutting down a flow battery system operating in a charging mode. In such embodiments, just before system shutdown, the negative electrolyte flow may be stopped while the positive electrolyte flow and the charging current are continued at their normal rate (or a different rate). Accordingly, in the above described state, all of the charged negative active species (e.g., $Cr^{2+}$) generated by the process remain in the negative half-cell. However, most of the charged positive active species (e.g., $Fe^{3+}$) generated in the process is flushed out of the positive half-cell by the flowing electrolyte. As a result, the charged negative electrolyte species (e.g., $Cr^{2+}$) concentration increases in the negative half-cell chambers while the charged positive electrolyte species ($Fe^{3+}$) concentration does not increase in the positive half-cell relative to normal operating conditions. The above described process may be continued until the concentration of the charged negative electrolyte species (e.g., $Cr^{2+}$) is greater than the concentration of the charged positive active species (e.g., $Fe^{3+}$) by a desired amount. As a result, an effective negative imbalance may be achieved in the cells, regardless of the imbalance of the entire system. When the desired negative imbalance is achieved, the system may be shut down by stopping all electrolyte flow and charging current. The negative imbalance will preserve a bismuth catalyst material on the negative electrode surface after the cells self discharge.

In other embodiments, a similar process may be used to achieve and maintain a negative in-cell imbalance when shutting down the flow battery system 10, which may be operating in a discharging mode. In such embodiments, just before system shutdown, the positive electrolyte flow may be stopped while the negative electrolyte flow and the discharging current are continued at their normal rate. By stopping only the positive electrolyte flow, most of the charged negative active species (e.g., $Cr^{2+}$) consumed in the negative half-cell is replenished by the flowing electrolyte, but most (or substantially all) of the charged positive active species (e.g., $Fe^{3+}$) consumed in the positive half-cell is removed from the positive half-cell due to discharging of the stagnant positive electrolyte. As a result, the charged negative active species (e.g., $Cr^{2+}$) concentration on the negative side may be maintained while the charged positive electrolyte species ($Fe^{3+}$) concentration on the positive side is diminished. This process may be continued until the concentration of the charged negative active species (e.g., $Cr^{2+}$) is greater than the concentration of the charged positive electrolyte species ($Fe^{3+}$) by a desired amount. As a result, an effective negative imbalance may be achieved in the cells, regardless of the imbalance of the entire system. When the desired imbalance is achieved, the system may be shut down by stopping all electrolyte flow and charging current. The negative imbalance will preserve a bismuth catalyst material on the negative electrode surface after the cells self-discharge.

In various embodiments, a flow-interruption process for establishing a negative imbalance prior to shutting down a flow battery may be applied to two-tank recirculating flow battery systems or to four-tank single-pass (e.g., cascade) flow battery systems.

When pumping electrolytes through a redox flow battery cell during normal operation, an inequality in the bulk volume of liquid electrolyte may often develop over time due to factors such as a pressure difference between the positive and negative electrolytes. The pressure difference may tend to cause migration of liquid across the separator membrane and/or may cause other leakage of liquid electrolyte from one half-cell to another (such as around seals). Various factors may cause this bulk volume inequality, but it is desirable to mitigate or reverse the effect because the volume difference can eventually substantially reduce a flow battery's capacity. In some cases, one or more of the flow-interruption processes for establishing a negative imbalance prior to shutting down a flow battery as described above may be leveraged to reverse or mitigate an electrolyte volume inequality.

Maintaining Negative Electrolyte Imbalance with Cell Configuration

In some cases, as in the above-described examples, electrolyte imbalance may be defined in terms of relative concentrations of charged and discharged reactants in the respective electrolytes. However, because one mole of positive reactant (e.g., $Fe^{3+}$) reacts with one mole of negative reactant (e.g., $Cr^{2+}$), electrolyte imbalance is fundamentally a function of relative moles of positive and negative reactants available for reaction within a cell. As a result, a second definition of electrolyte imbalance may be based on relative moles of reactants. When the volumes of the two electrolytes are the same, the two definitions of imbalance (concentration-based and reactant mole based) have the same result. On the other hand, if the volumes of electrolytes in the two half-cells are not equal, then an effective imbalance may exist even if the two electrolytes have equal concentrations of charged species.

In various embodiments, a cell with a negative electrode chamber that is sufficiently larger than the positive electrode chamber will effectively operate at a negative imbalance even if the active material concentrations in the electrolytes are configured with a zero or positive imbalance. In this way, a negative electrolyte imbalance may be maintained within one or more cells while the electrolyte in the tanks may have zero imbalance or a positive imbalance. An approach whereby a negative electrode chamber is configured to be larger than a positive electrode chamber, which produces a negative imbalance locally within the flow battery cells, has the advantage of not sacrificing electrolyte capacity in the tank in order to maintain negative imbalance.

Figure 8:
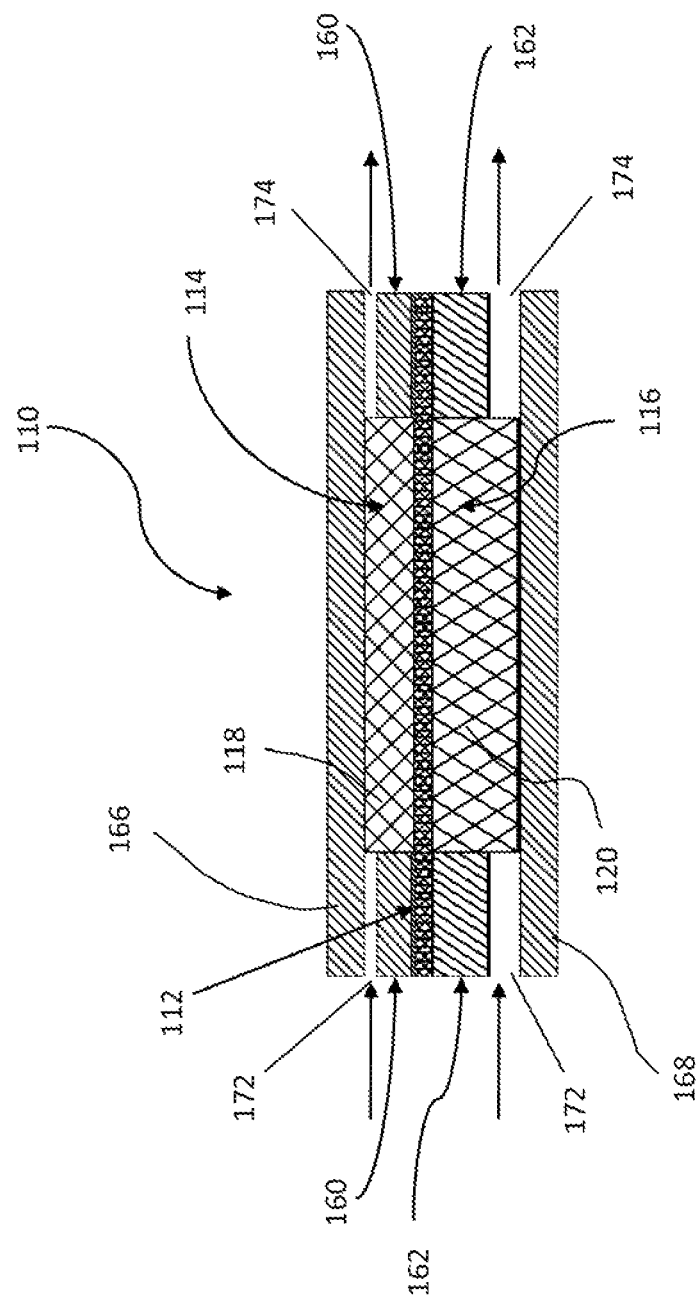
FIG. 8 is a diagram illustrating a cross sectional view of a flow battery cell with a negative electrode chamber that has a larger volume than the positive electrode chamber in various embodiments.

FIG. 8 illustrates an embodiment of a cell 110 with a negative electrode chamber 116 that is larger than a corresponding positive electrode chamber 114. In the illustrated embodiment, the negative electrode chamber is enlarged in at least a dimension perpendicular to the separator membrane 112. In alternative embodiments, the negative electrode chamber (and corresponding conductive felt material) may be enlarged in any or all dimensions to increase its volume relative to the volume of the positive electrode chamber.

In various embodiments, the ratio of negative-chamber volume to positive chamber volume may be between about 1.1 and about 5, depending on an expected range of active material concentrations and the degree of negative imbalance desired. Table 1 below provides an example of chamber volumes and electrolyte concentrations for a cell with a larger negative electrode chamber.

TABLE 1

| Cell compartment | Volume (L) | Concentration (M) | Moles |
|---|---|---|---|
| Positive | 0.1 | $Fe^{3+}$ = 0.25 | 0.025 |
| Negative | 0.2 | $Cr^{2+}$ = 0.20 | 0.040 |

The values in Table 1 show that although the concentration of $Fe^{3+}$ in the cell is higher than the concentration of $Cr^{2+}$, the number of moles of $Fe^{3+}$ is less than that of $Cr^{2+}$ due to the smaller volume of the positive chamber. When the cell self-discharges, $Fe^{3+}$ and $Cr^{2+}$ react with each other according to the reaction:

$$Fe^{3+}+Cr^{2+} \rightarrow Fe^{2+}+Cr^{3+} \qquad EQ(5)$$

After the self-discharge reaction of EQ(5) occurs in the cell described by Table 1, all $Fe^{3+}$ is consumed and 0.015 moles of $Cr^{2+}$ is left. Therefore, negative imbalance is maintained in the cell. This quantity of excess $Cr^{2+}$ may be expected to evenly distribute within the positive and negative chambers which have a total combined volume of 0.3 L. So the final $Cr^{2+}$ concentration is 0.015/0.3=0.05 M. This excess $Cr^{2+}$ will preserve the Bi metal on the negative felt.

Figure 9:
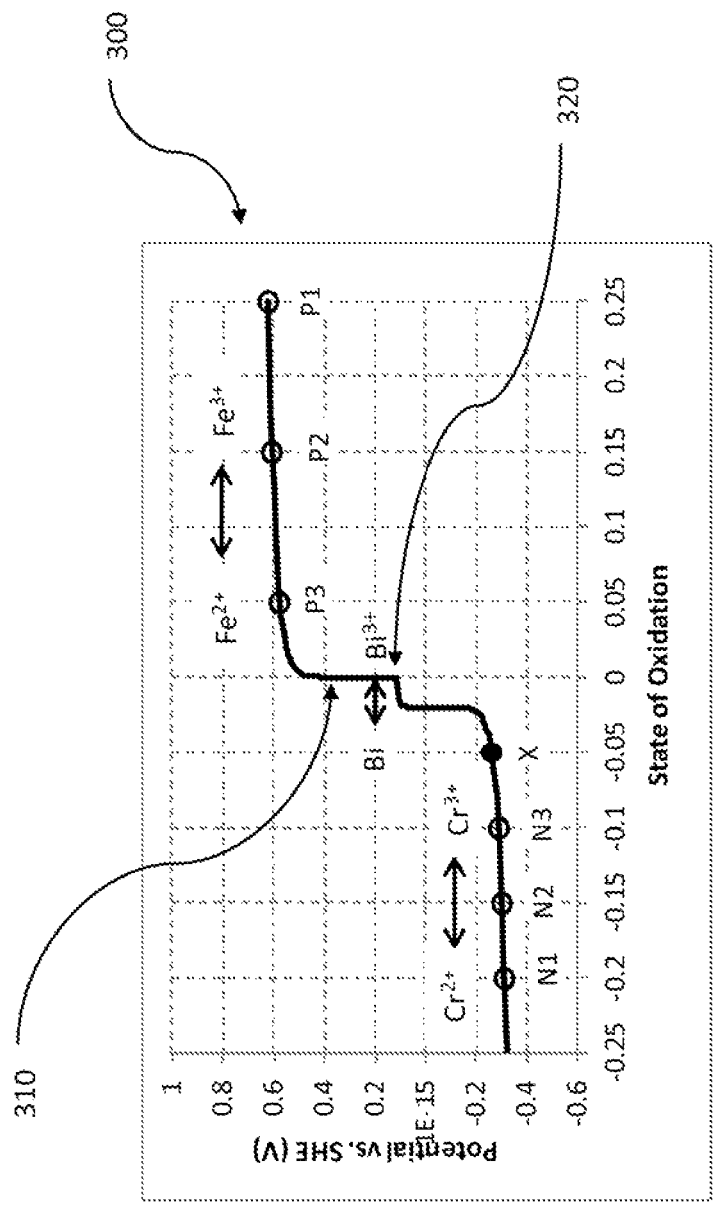
FIG. 9 is a graph illustrating a state-of-oxidation vs. electric potential relationship between SOO and potential of reactants during self-discharge of in an Fe/Cr flow battery cell with a negative electrode chamber that has a larger volume than the positive electrode chamber and a bismuth catalyst on the negative electrode in various embodiments.

The above example can also be understood with reference to the potential vs. SOO curve 310 in FIG. 9. Initially, the positive electrolyte is represented by point P1 ($Fe^{3+}$=0.25M), the negative electrolyte by N1 ($Cr^{2+}$=0.20M). During discharge, the positive electrolyte moves to P2, then to P3. The negative electrolyte moves to N2, then to N3. When the cell is completely discharged, the compositions of the two electrolytes become the same, and are represented by a single point X. Compared to FIG. 5 or FIG. 6, FIG. 9 differs in that the SOO at point X is not just the simple average of the SOO of the two original points P1 and N1, but an SOO based on a chamber-volume-weighted average as illustrated by the following:

$$SOO_X = (SOO_{P1} \times V_P + SOO_{N1} \times V_N)/(V_P + V_N) \quad \text{EQ (6)}$$

$$= (0.25 \times 0.2 + (-0.2) \times 0.2)/(0.1 + 0.2) \quad \text{EQ (6A)}$$

$$= -0.05 \quad \text{EQ (6B)}$$

Where SOOx is the SOO at point X at the end of the self-discharge process; $SOO_{P1}$ is the positive electrolyte SOO at point P1; $V_P$ is the volume of the positive electrode chamber (in L); $SOO_{N1}$ is the negative electrolyte SOO at point N1; and $V_N$ is the volume of the negative electrode chamber (in L).

When the overall electrolyte imbalance is positive, the ease with which a negative imbalance may be obtained in the cell, may depend on the state-of-charge (SOC). Table 2 below illustrates the in-cell imbalance after complete discharge of electrolytes with an overall positive imbalance of 0.1M in a cell in which the negative electrode chamber has a volume of 0.2 L and the positive electrode chamber has a volume of 0.1 L.

TABLE 2

Imbalance In Example Cell Varies With State Of Charge

| State of charge | $Fe^{3+}$(M) in pos. Chamber | $Cr^{2+}$(M) in neg. Chamber | $Fe^{3+}$ moles | $Cr^{2+}$ moles | Excess $Cr^{2+}$ moles | Calculation |
|---|---|---|---|---|---|---|
| 0.7 | 0.8 | 0.7 | 0.08 | 0.14 | 0.06 | 0.7*0.2 − 0.8*0.1 = 0.06 |
| 0.5 | 0.6 | 0.5 | 0.06 | 0.1 | 0.04 | 0.5*0.2 − 0.6*0.1 = 0.04 |
| 0.3 | 0.4 | 0.3 | 0.04 | 0.06 | 0.02 | 0.3*0.2 − 0.4*0.1 = 0.02 |
| 0.1 | 0.2 | 0.1 | 0.02 | 0.02 | 0 | 0.1*0.2 − 0.2*0.1 = 0 |

The values in Table 2 show that the degree of negative imbalance (i.e. the excess $Cr^{2+}$) increases (e.g. imbalance becomes more negative) with increasing state of charge. Such a condition is desirable in a flow battery system with a cascade stack because the action of, for example, the bismuth is more important for stages at higher states of charge. Therefore, in some embodiments it may be acceptable to maintain a negative in-cell electrolyte imbalance only for the stages designated for higher state of charge operation.

Figure 10:
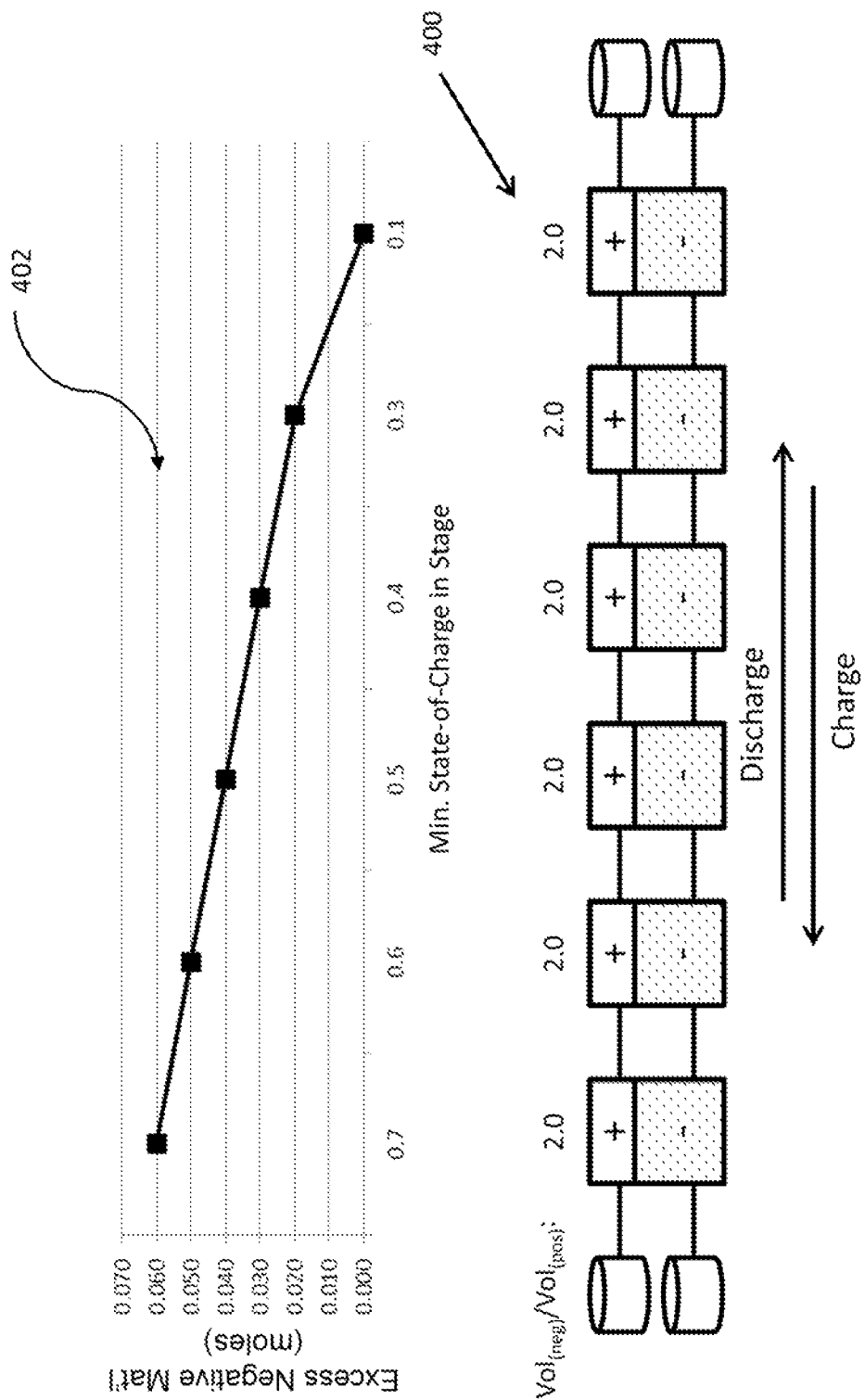
FIG. 10 is a block diagram and a graph illustrating an example of decreasing excess charged negative reactant after self-discharge of cells within lower state-of-charge stages of a cascade stack in which all cascade stages have uniform negative/positive chamber volume ratios in various embodiments.

FIG. 10 is a block diagram illustrating a four-tank flow battery system with a six-stage bi-directional cascade flow battery stack 400 in which the cells of all stages have enlarged negative electrode chambers relative to their corresponding positive electrode chambers as in the above example. In the example of FIG. 10, the ratio of the negative chamber volume to the positive chamber volume is the same (2.0) at all stages. The graph 402 above the cascade block diagram schematically illustrates the minimum state-of-charge for which each stage is configured (on the horizontal axis) and the rate of change of excess charged negative active material in each stage according to the example described above with reference to Table 2. As illustrated by FIG. 10 and as discussed above with reference to Table 2, if all cascade stages have the same ratio of negative cell chamber volume to positive cell chamber volume, the effective negative imbalance will become less negatively imbalanced, in each successive stage as state-of-charge decreases.

In alternative embodiments, a cascade flow battery stack may be configured such that stages configured for lower state-of-charge operation may have higher ratios of negative cell chamber volume to positive chamber volume relative to stages configured for higher state-of-charge operation. A relative increase in negative-to-positive chamber volume ratios in successive cascade stages will generally have the effect of increasing the slope of the negative imbalance curve 402 of FIG. 10.

Figure 11:
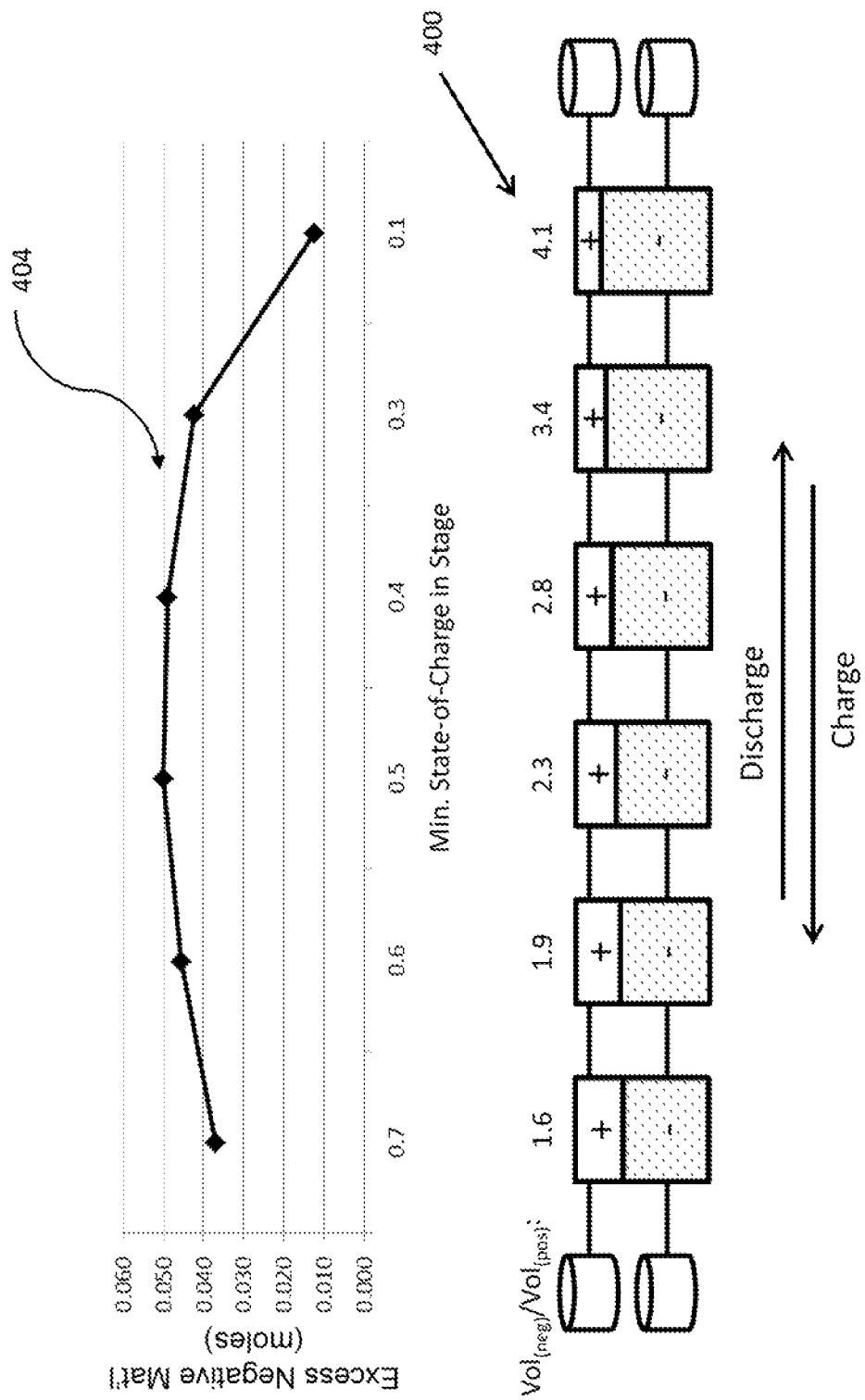
FIG. 11 is a block diagram and a graph illustrating an example of varying excess charged negative reactant after self-discharge of cells within a cascade stack in which cascade stages have different negative/positive chamber volume ratios depending on expected state-of-charge in various embodiments.

For example, FIG. 11 illustrates the relationship between the quantity in moles of the excess negatively charged active material and the minimum state-of-charge for a four-tank flow battery system. The four tank flow battery system may be configured with a six-stage bi-directional cascade flow battery stack 400 in which the cell chambers of each stage have been sized with negative-to-positive chamber volume ratios that increase with decreasing SOC in order to increase the excess negative charged active material (e.g., $Cr^{2+}$) remaining after self-discharge of the cells. As indicated by labels above the block diagram, the ratios of negative-to-positive cell chamber volume increase from 1.6 at the high SOC end of the cascade to 4.1 at the low SOC end. The graph 404 of FIG. 11 assumes that the total cell volume is constant throughout the cascade. In other embodiments, the total cell volume of cells in each stage may also be varied in order to achieve requirements.

In various embodiments, a cell or a stack of cells may be configured to maintain at least a threshold negative imbalance under expected operating conditions and other factors. In addition to state-of-charge and imbalance, an excess quantity of negative reactant may be a factor in configuring a cell for passively maintaining a desired degree of negative imbalance.

In other embodiments, a desired negative imbalance may be established and maintained within a two-tank recirculating flow battery system by configuring cells of the stack with larger negative electrode chambers than positive chambers. A four-tank cascade system, in which electrolytes may flow through a charge/discharge stack only once during a charge or discharge process, may differ from a two-tank system in some aspects. For example, in a two-tank recirculating system electrolytes repeatedly re-circulate between the tanks and the stack, charging or discharging slightly during each pass. A two-tank system may still be at risk of a loss of catalyst during stagnant (e.g., non-circulating) or cell-reversal conditions. As a result, the stack may be configured for worst-case conditions. Therefore, in order to maintain a negative electrolyte imbalance by cell configuration, the ratio of negative chamber volume to positive chamber volume may be configured to maintain a negative imbalance under the worst case conditions that the stack may experience. As described above, worst case conditions may occur at low state-of-charge and when the concentration imbalance of the electrolytes is highly positive.

In some embodiments, various active and passive methods may be used in combination to avoid losing catalyst material during stagnant or reverse-polarity conditions within flow battery cells. For example, a flow battery system may combine an active rebalancing process configured to achieve and maintain a desired negative imbalance based on the concentration of charged reactants in the electrolytes with a cell configuration in which negative electrode chambers have larger volumes than positive electrode chambers in order to maintain an effective negative imbalance within the cells.

In some embodiments, it may also be desirable to combine any of the foregoing embodiments with traditional approaches to preventing catalyst loss. As indicated above, such traditional methods may include applying a small continuous electric current ("trickle charge") to the cells, or continuously pumping electrolytes at a relatively low flow rate during stagnant conditions.

Re-Starting Flow Battery Operation after Shut Down

In some embodiments, a negative electrolyte imbalance may eventually be lost if a flow battery is left in a shut-down condition with no electrolytes flowing and no electric current flowing for a long period of time on the order of weeks or months. Such a loss of negative imbalance over long periods of shut-down time may be caused by one or more spontaneous processes, such as hydrogen generation, oxygen ingress or other processes. Such processes may include any spontaneous process causing electrolyte imbalance to become less negative until imbalance approaches zero or even becomes positive.

Regardless of the causes, a time required for a given system to lose a negative imbalance while shut down may be determined empirically by leaving a system shut down for a period of time and evaluating the imbalance at periodic intervals. Once such a time-to-zero-imbalance has been even approximately determined, a maintenance process may be scheduled to prevent the electrolytes from losing a negative imbalance. Such a maintenance process may be scheduled at a maintenance interval that is less than an expected time until the electrolytes reach a zero imbalance by a sufficient margin to account for any variation and/or errors in measurement.

In various embodiments, a maintenance process may include any of the processes described above for establishing or maintaining a negative imbalance. For example at a maintenance interval time after a flow battery is shut down, a rebalancing process may be initiated to charge a negative electrolyte or to further discharge a positive electrolyte. Alternatively, a charging current may be applied while pumping only the positive electrolyte through the cells as described above.

In cases in which cells are configured with larger negative half-cell chambers than positive half-cell chambers, a maintenance process may include applying a charging current with at least the negative electrolyte sitting stagnant in the cells to avoid losing any dissolved bismuth (e.g., $Bi^{3+}$). Alternatively, using such a system, a maintenance process may include applying a charging current while flowing the positive electrolyte through the cells. One reason for maintenance charging is to maintain or establish a negative SOO in the electrolyte in the negative half cell chamber.

Alternatively, if a reservoir of charged negative electrolyte is available, a maintenance process may include flowing a volume of charged negative electrolyte into the cells, thereby replacing any negative electrolyte that may have an insufficient SOO to maintain a negative imbalance. To be effective, such a "charged" negative electrolyte may be at any SOO that is higher than the SOO of the electrolyte being replaced. However, such an approach may have disadvantages in that any $Bi^{3+}$ may be chemically reduced to bismuth metal in solution and therefore may not be electrochemically plated on the surface of the electrodes.

Alternatively, depending on the intended use of a flow battery system, and a planned duration of shut-down time, an electrolyte imbalance of a flow battery system may simply be allowed to become zero as a result of processes occurring during a long shut-down period. In such cases, prior to re-starting normal operation of the flow battery, a charging current may be applied while electrolytes remain stagnant within the cells, thereby re-plating any de-plated catalyst material, such as bismuth. Once a sufficient time has elapsed such that de-plated catalyst material may be expected to be re-plated on the electrode(s), one or more normal flow battery operations may be resumed.

Electronic Controller

Figure 12:
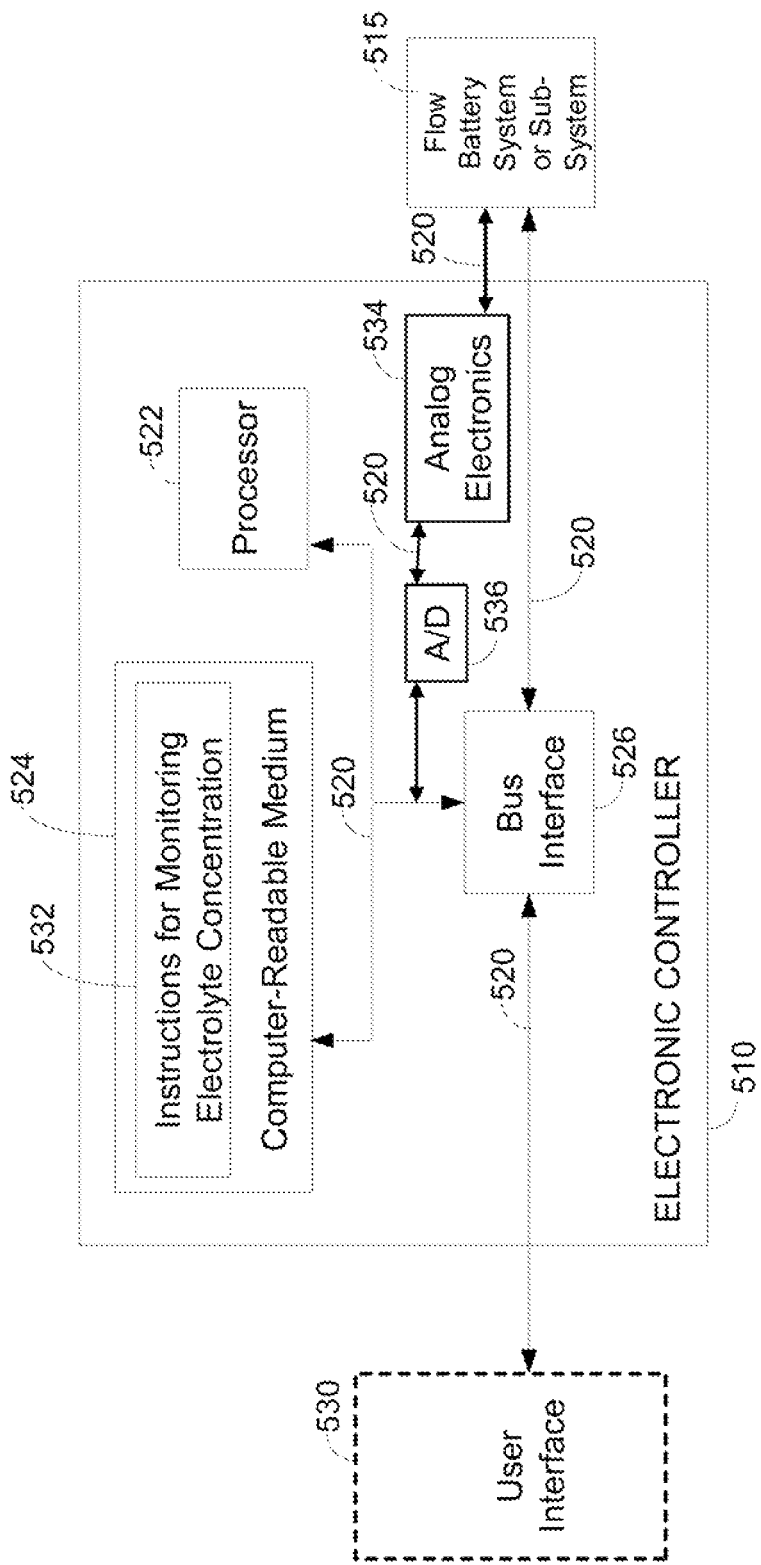
FIG. 12 is a schematic diagram illustrating an example controller suitable for use in various embodiments described herein.

FIG. 12 is a schematic block diagram illustrating an example of a hardware implementation for an electronic controller 510 that may be used to control a system 515 such as an entire flow battery system, or a sub-system of the flow battery system, such as a rebalance sub-system or an electrolyte concentration monitoring sub-system (or all of these). In the illustrated example, the electronic controller 510 may be implemented with a bus architecture, represented generally by the bus 520. The bus 520 may include any number of interconnecting buses and bridges depending on the specific application of the electronic controller 510 and the overall system constraints. For ease of description, the bus 520 is shown as connecting all elements in the system. Therefore, the bus 520 may be understood to refer, in a non-limiting and non-exhaustive manner, to digital and analog data lines, digital and analog control lines, power lines and other lines that may be required to perform control, data transfer, and monitoring with regard to any or all of the systems or sub-systems that are coupled, directly or indirectly to the bus 520.

The bus 520 may link together various circuits including one or more processors, represented generally by the processor 522, and a memory, computer-readable media, or other storage device, represented generally by a computer-readable medium 524. The processor 522 may also include an internal memory, or alternatively, the processor and the computer readable memory 524 may be integrated in a single device. The bus 520 may also link various other circuits such as timing sources, peripherals, sensors, and power management circuits, and other circuits, which are well known in the art, and therefore, are not specifically shown and will not be described. A bus interface 526 may provide an interface between the bus 520 and the system to be controlled 515 and other systems, circuits and peripherals. The bus interface 526 may provide the ability to manage data transfer between various systems and circuits, and, for example, the processor 522, and the computer readable medium 524. Depending upon the nature of the apparatus, a user interface 530 (e.g., keypad, display, speaker, microphone, joystick) may also be provided and may be coupled to the processor 522 and other systems and circuits, through a connection to the bus 520.

The processor 522 may be configured to conduct operations for controlling the system 515. The processor 522 may also perform operations to manage the bus 520, for example, in connection with the bus interface 526. The processor 522 may perform processing to conduct operations for performing embodiment methods as described herein. For example, the processor 522 may read and execute instructions 532, which may be stored on the computer-readable medium 524. The instructions, when read and executed by the processor 522, may cause the electronic controller 510 to perform any of the various control functions described above for any particular apparatus, such as the system 515. The computer-readable medium 524 may also be used for storing data that is manipulated by the processor 522 when executing the instructions 532.

In some embodiments, analog electronics 534 may also be joined to the bus 520 by an analog-to-digital converter 536, which may also function as a digital-to-analog converter. Analog electronics 534 may be provided to perform various analog functions such as analog control, voltage regulation, electric current measurement, current regulation or other functions. Such analog electronics may provide sensor data to the controller for use by the processor 522, for example when executing the instructions 532 in performing various control actions or other algorithms, including as described herein.

The computer readable medium 524 may also contain instructions 532 for controlling analog electronic components.

In addition to the Fe/Cr flow battery chemistry, the various embodiments described herein may be adapted for use with many other redox flow battery chemistries using at least one flowing liquid electrolyte. For example, some known alternative flow battery chemistries include: all vanadium (V/V), iron-vanadium (Fe/V), hydrogen bromine (HBr), tin-iron (Sn/Fe), vanadium cerium (V/Ce), vanadium-polyhalide (V/Br$_2$), iron-bromine (Fe/Br$_2$), titanium-iron (Ti/Fe), iron-ethylenediaminetetraacetic acid-bromine (Fe-EDTA/Br), zinc-cerium (Zn/Ce), zinc-bromine (Zn/Br), and bromine polysulfide (S/Br$_2$). The various embodiments described herein may also be applied to other electrochemical flow systems that are not necessarily configured for the purpose of storing and/or releasing energy, such as electrosynthesis systems and others. Additionally, while some examples above describe flow battery systems configured for both charging and discharging, the inventive systems and methods may also be applied to flow battery systems configured exclusively for either charging or discharging.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, in applying embodiments to various alternative flow battery chemistries, differences in factors such as start-points, stop-points, starting electrolyte concentrations, and others may become apparent in view of the foregoing description. Similarly, the various embodiments described herein may be applied in order to maintain a positive imbalance to counter-act deleterious effects of a negative imbalance in a flow battery system that may suffer from side-reactions tending to cause a negative imbalance under normal operation. Thus, the present invention is not intended to be limited to the embodiments shown herein, and instead the claims should be accorded the widest scope consistent with the principles and novel features disclosed herein.

What is claimed is:

1. A method of operating a flow battery, comprising:
controlling one or more of: an operating characteristic; and a physical characteristic of at least one component of the flow battery having a positive liquid electrolyte arranged to flow through a positive half-cell of a flow-through reaction cell and a negative liquid electrolyte arranged to flow through a negative half-cell of the flow-through reaction cell, wherein the negative liquid electrolyte in the negative half-cell of the flow-through reaction cell contains a first quantity of a negative reactant in an oxidized ionic state and a second quantity of the negative reactant in a reduced ionic state, and the positive liquid electrolyte in the positive half-cell of the flow-through reaction cell contains a first quantity of a positive reactant in a reduced ionic state and a second quantity of the positive reactant in an oxidized ionic state; and
maintaining a negative imbalance in which the second quantity of the negative reactant in the reduced ionic state in the negative liquid electrolyte in the negative half-cell is greater than the second quantity of the positive reactant in the oxidized ionic state in the positive liquid electrolyte in the positive half-cell,
wherein:
maintaining the negative imbalance is based on controlling the at least one of: the operating characteristic; and the physical characteristic of the at least one component;
the negative imbalance is a difference obtained by subtracting the second quantity of the negative reactant in the reduced ionic state from the second quantity of the positive reactant in the oxidized ionic state; and
when charging the flow battery by applying an electric current to the cell; a portion of the first quantity of the negative reactant is reduced from the oxidized ionic state to the reduced ionic state and a portion of the first quantity of the positive reactant is oxidized from the reduced ionic state to the oxidized ionic state;
determining that the obtained difference of the negative imbalance is less negative than a threshold negative imbalance; and
processing at least one of the positive electrolyte and the negative electrolyte to cause the negative imbalance to become more negative;
wherein the second quantity of the negative reactant in the reduced ionic state in the negative liquid electrolyte, the second quantity of the positive reactant in the oxidized ionic state in the positive liquid electrolyte, and the negative imbalance are molar concentrations, and wherein the threshold negative imbalance is between −0.01M and −0.05M; and
wherein processing at least one of the positive electrolyte and the negative electrolyte to cause the negative imbalance to become more negative proceeds until the negative imbalance is between −0.05M and −0.20M.

2. The method of claim 1, further comprising maintaining the negative imbalance during at least a charging mode, a discharging mode, and a power-off mode in which electrolytes do not flow and are neither charged nor discharged.

3. The method of claim 1, wherein processing at least one of the positive electrolyte and the negative electrolyte comprises decreasing the second quantity of the positive reactant in the oxidized ionic state in the positive electrolyte.

4. The method of claim 1, wherein processing at least one of the positive electrolyte and the negative electrolyte comprises increasing the second quantity of the negative reactant in the reduced ionic state in the negative electrolyte.

5. The method of claim 4, further comprising providing a greater quantity of total negative reactant in the negative electrolyte than positive reactant in the positive electrolyte, wherein the total negative reactant is the sum of the first quantity of the negative reactant in the reduced ionic state and the second quantity of the negative reactant in the oxidized ionic state and the total positive reactant is the sum of the first quantity of the positive reactant in the reduced ionic state and the second quantity of the positive reactant in the oxidized ionic state.

6. The method of claim 1, wherein processing at least one of the positive electrolyte and the negative electrolyte comprises decreasing the second quantity of the positive reactant in the oxidized ionic state in the positive electrolyte and increasing the second quantity of the negative reactant in the reduced ionic state in the negative electrolyte.

7. The method of claim 1, wherein the second quantity of the negative reactant in the reduced ionic state in the negative electrolyte is $Cr^{2+}$ and the second quantity of the positive reactant in the oxidized ionic state in the positive electrolyte is $Fe^{3+}$.

8. The method of claim 1, further comprising maintaining a concentration of the negative reactant in the reduced ionic state in an entire volume of the negative liquid electrolyte at least 0.1M greater than a concentration of the positive reactant in the oxidized ionic state in an entire volume of the positive liquid electrolyte.

9. The method of claim 8, further comprising providing a greater quantity of total negative reactant in the negative electrolyte than positive reactant in the positive electrolyte, wherein the total negative reactant is the sum of the first quantity of the negative reactant in the reduced ionic state and the second quantity of the negative reactant in the oxidized ionic state and the total positive reactant is the sum of the first quantity of the positive reactant in the reduced ionic state and the second quantity of the positive reactant in the oxidized ionic state.

10. The method of claim 1, wherein the negative half-cell includes a negative electrode having a catalyst plated on a surface thereof, the method further comprising maintaining the negative half-cell at a negative electrochemical potential to inhibit deplating of the catalyst when the cell is discharged to zero volts.

11. The method of claim 10, wherein the catalyst comprises bismuth, the negative reactant in the reduced ionic state in the negative electrolyte is $Cr^{2+}$ and the positive reactant in the oxidized ionic state in the positive electrolyte is $Fe^{3+}$.

12. The method of claim 4, wherein processing at least one of the positive electrolyte and the negative electrolyte to cause the negative imbalance to become more negative is performed by a rebalance sub-system of the flow battery.

13. The method of claim 1, further comprising:
in a charging shut-down mode of the flow battery, stopping a first flow of the negative liquid electrolyte through the negative half-cell of the cell of the flow battery while continuously allowing a second flow of the positive liquid electrolyte through the positive half-cell of the cell of the flow battery and applying a charging current to the cell; and
after a period of time, shutting down the flow battery by stopping the second flow of the positive electrolyte and stopping the charging current to the cell.

14. The method of claim 1, further comprising:
in a charging shut-down mode of the flow battery, stopping a first flow of the negative liquid electrolyte through the negative half-cell of the cell of the flow battery and stopping a second flow the positive liquid electrolyte through the positive half-cell of the cell of the flow battery and applying a charging current to the cell; and
after a period of time, shutting down the flow battery by stopping the charging current to the cell.

15. The method of claim 1, further comprising:
in a restart mode of the flow battery, stopping a first flow of the negative liquid electrolyte through the negative half-cell of the cell of the flow battery and stopping a second flow the positive liquid electrolyte through the positive half-cell of the cell of the flow battery; and
after a first period of time, applying a charging current to the cell with electrolytes stagnant in the cell for a second period of time, and resuming operation of the flow battery by stopping the charging current to the cell and re-starting the first flow and the second flow.

16. The method of claim 13, further comprising re-starting one of a charging process, a discharging process or a rebalancing process, before the electrolytes reach a state of zero imbalance due to spontaneous reactions.

17. The method of claim 1, further comprising:
in a discharging shut-down mode of the flow battery, stopping a first flow of the positive liquid electrolyte through the positive half-cell of the cell of the flow battery, while continuously allowing a second flow of the negative electrolyte through the negative half-cell of the cell of the flow battery and removing a discharging current from the cell; and
after a period of time, shutting down the flow battery by stopping flow of the negative electrolyte and stopping the discharging current from the cell.

18. The method of claim 17, further comprising, after shutting down the flow battery, initiating a charging process, a discharging process or a rebalancing process before the electrolytes reach a state of zero imbalance due to spontaneous reactions.

* * * * *